United States Patent
Tarumizu

[19]

[11] Patent Number: 6,073,451

[45] Date of Patent: Jun. 13, 2000

[54] FREEZING CHUCK TYPE MACHINING METHOD

[76] Inventor: Yoshitaka Tarumizu, 1164-12, Ichigao-cho, Aoba-ku, Yokohama-shi Kanagawa 225, Japan

[21] Appl. No.: 08/836,141

[22] PCT Filed: Aug. 12, 1996

[86] PCT No.: PCT/JP96/02282

§ 371 Date: Apr. 16, 1997

§ 102(e) Date: Apr. 16, 1997

[87] PCT Pub. No.: WO97/06920

PCT Pub. Date: Feb. 27, 1997

[30] Foreign Application Priority Data

Aug. 17, 1995 [JP] Japan ................................. 7-232027

[51] Int. Cl.[7] .......................... F25D 25/00; B25B 1/00
[52] U.S. Cl. ...................... 62/62; 62/64; 269/7
[58] Field of Search ........................ 62/64, 62; 269/7

[56] References Cited

U.S. PATENT DOCUMENTS

| | | | |
|---|---|---|---|
| 4,091,580 | 5/1978 | Oates | 269/7 X |
| 4,463,927 | 8/1984 | Sopori et al. | 269/7 X |
| 4,509,673 | 4/1985 | Schmidt et al. | 269/7 X |
| 4,607,496 | 8/1986 | Nagaura | 62/64 |
| 4,629,378 | 12/1986 | Parsons | 269/7 X |
| 4,730,382 | 3/1988 | Parsons | 269/7 X |
| 4,822,013 | 4/1989 | Johnson | 269/7 |
| 5,138,918 | 8/1992 | Attardi et al. | 269/7 X |
| 5,357,762 | 10/1994 | Charton | 62/64 |

*Primary Examiner*—Christopher B. Kilner
*Attorney, Agent, or Firm*—Michael J. Striker

[57] ABSTRACT

The invention relates to an improved method for chucking and machining a workpiece using a freezing type chuck device. A macromolecular freezing agent whose freezing point is higher than that of water is interposed at least between a workpiece and a fixing surface, and the workpiece is fixed using this macromolecular freezing agent as an adhesive medium by cooling the fixing surface. The macromolecular freezing agent may be a liquid, a cream or a paste, and is typically silicone oil based. The workpiece may be directly fixed to the fixing surface of a freezing type chuck device by the macromolecular freezing agent or alternatively the workpiece may be fixed to a pallet by the macromolecular freezing agent and the pallet may be fixed to the fixing surface.

17 Claims, 10 Drawing Sheets

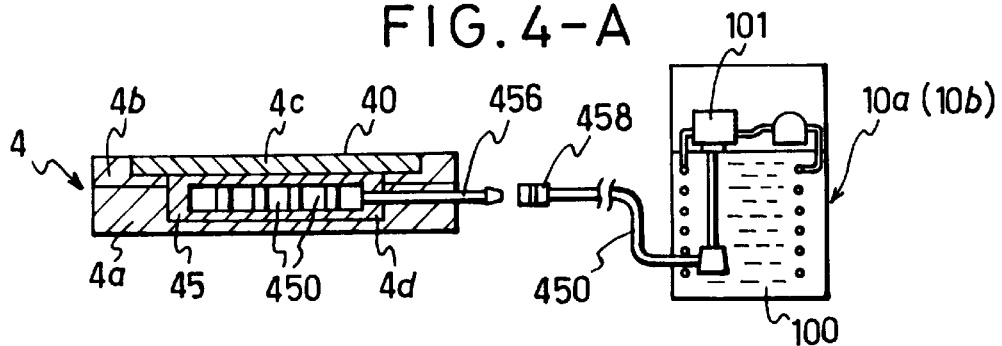
FIG. 4-A
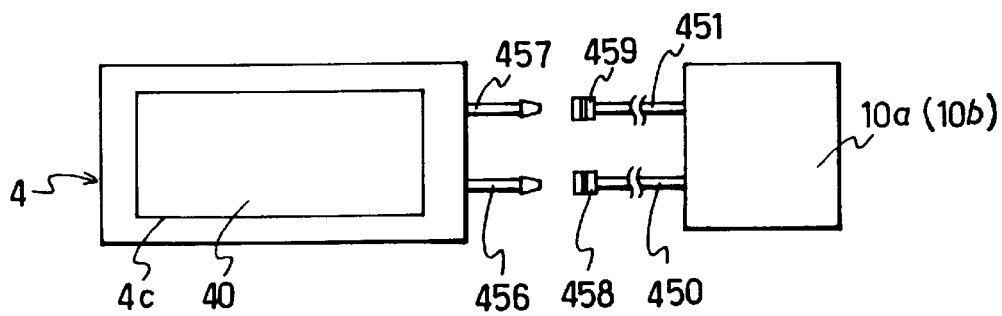
FIG. 4-B
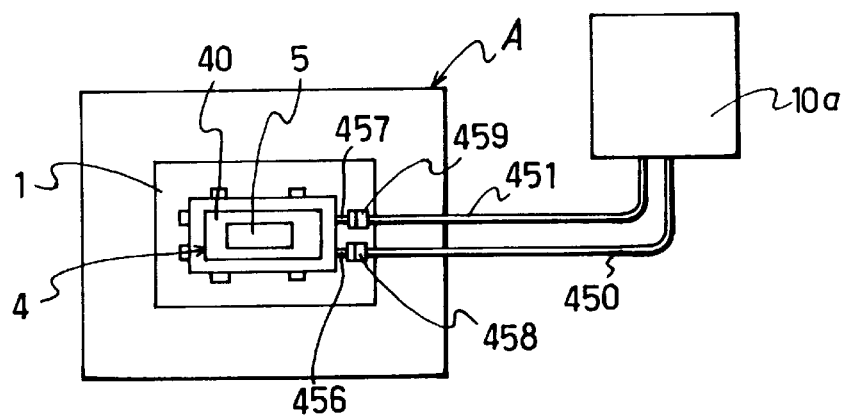
FIG. 9
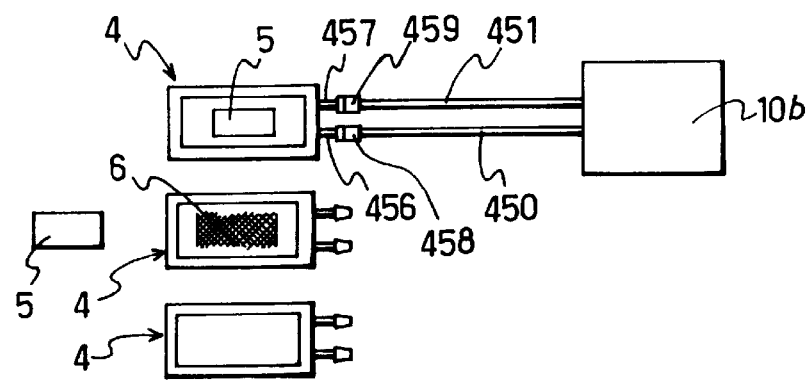

FIG. 5-A
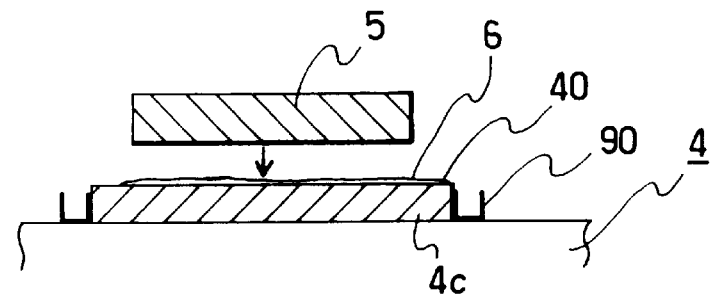
FIG. 5-B
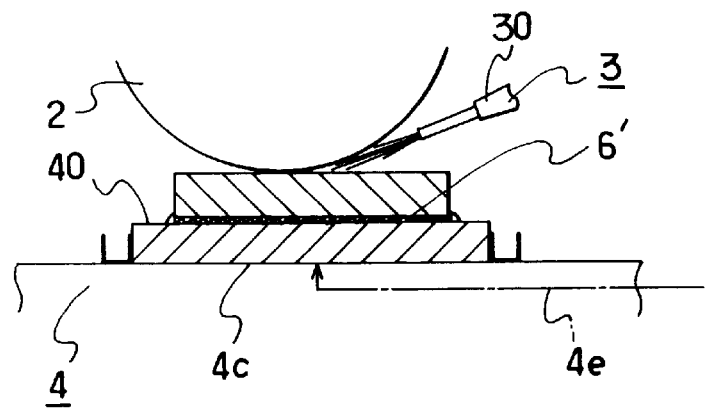
FIG. 5-C
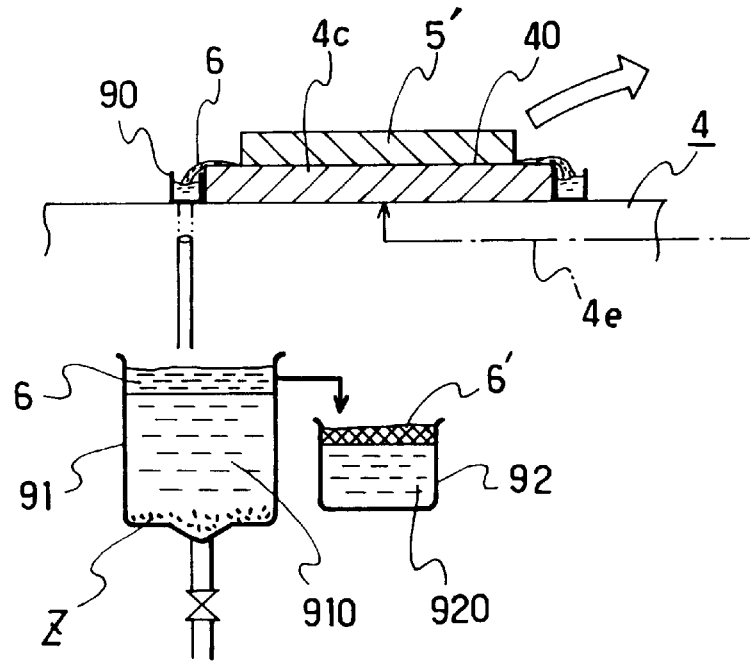

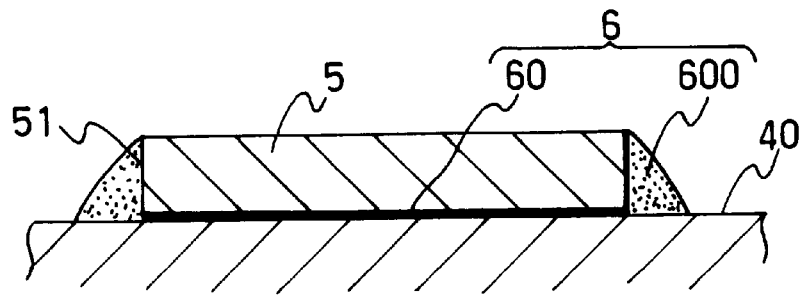
FIG. 6-A
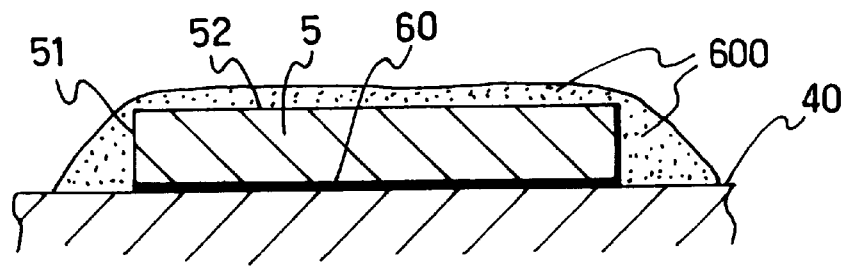
FIG. 6-B
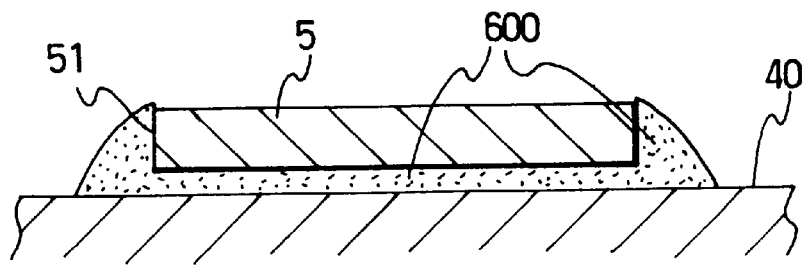
FIG. 6-C
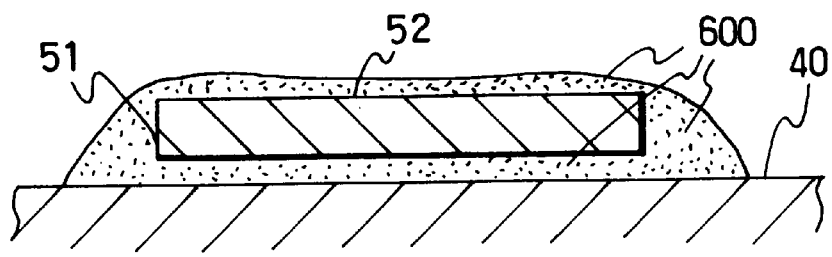
FIG. 6-D

FIG. 7-A
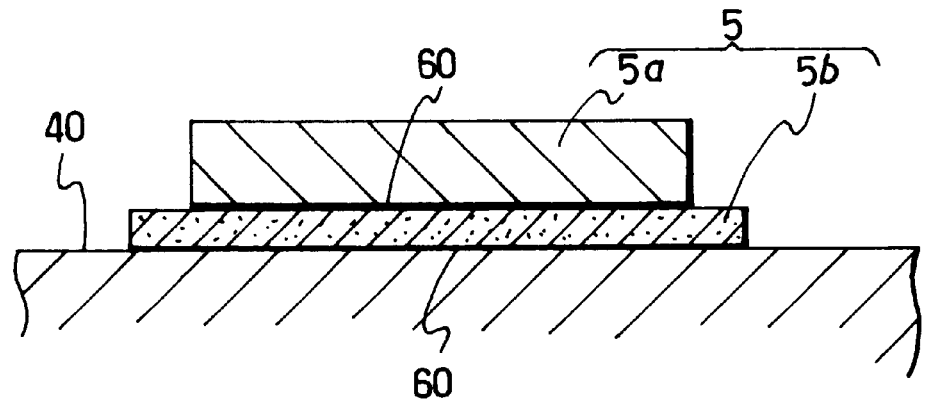
FIG. 7-B
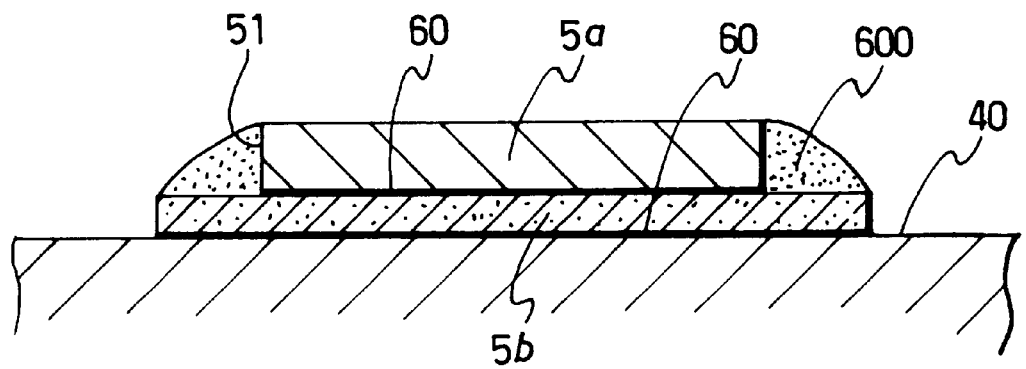
FIG. 7-C
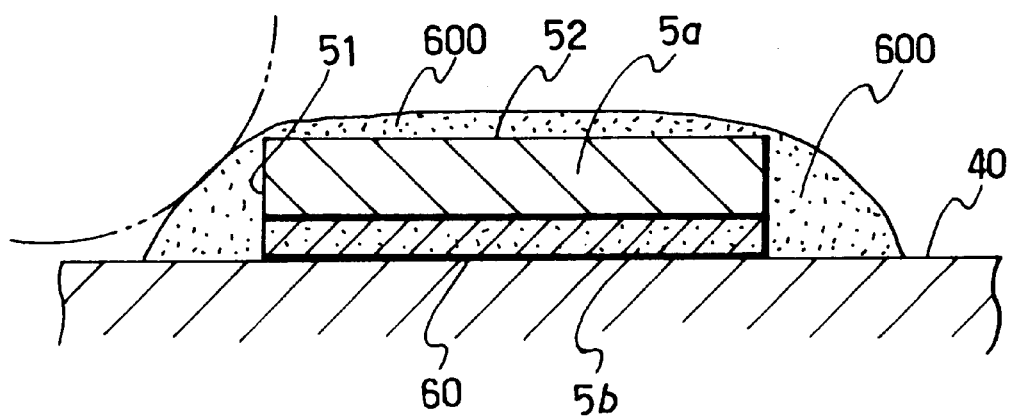

FIG.8-A
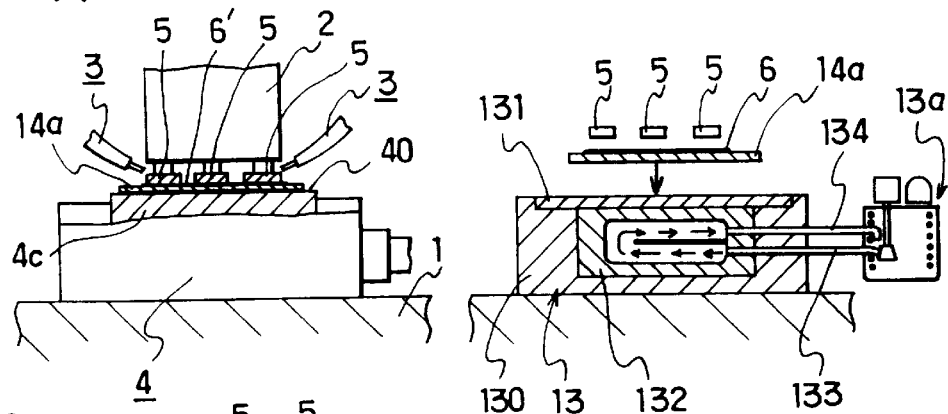
FIG.8-B
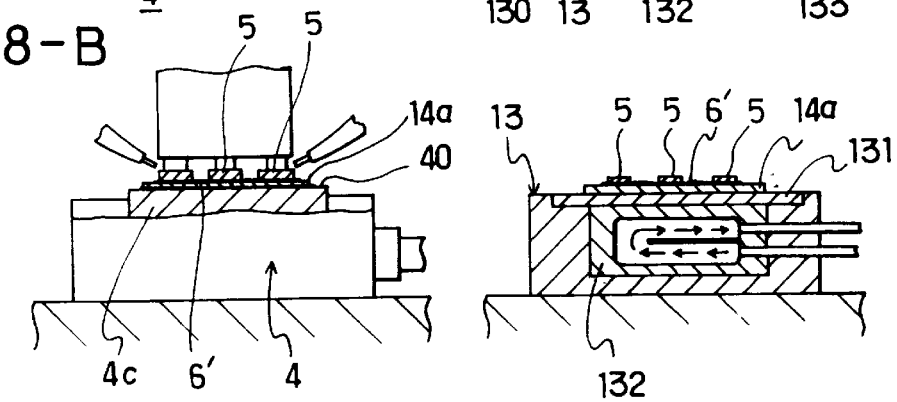
FIG.8-C
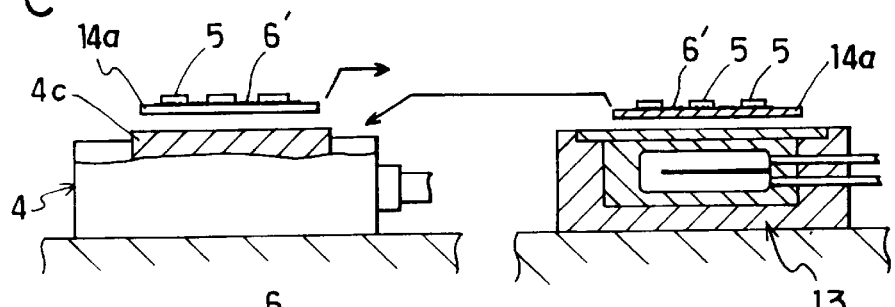
FIG.8-D
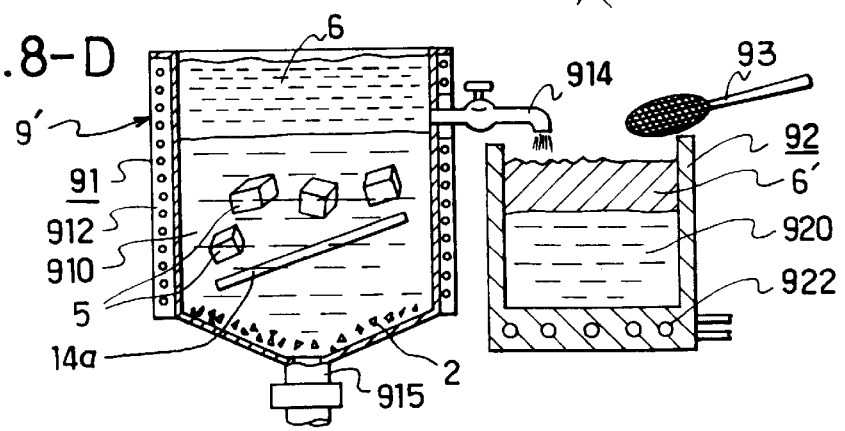

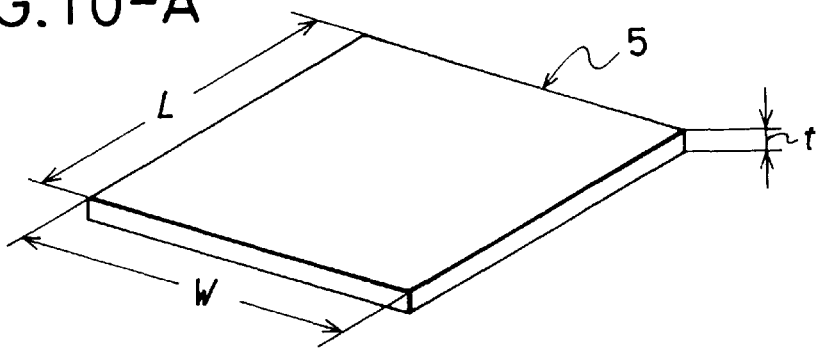
FIG.10-A
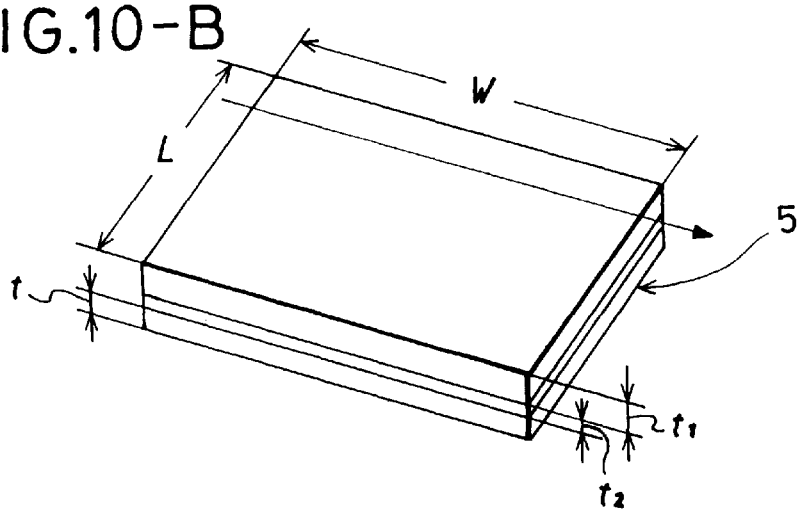
FIG.10-B
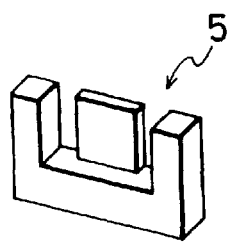
FIG.11-A
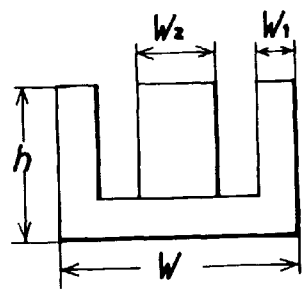
FIG.11-B
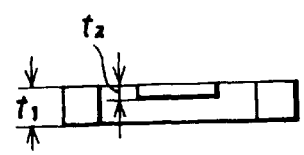
FIG.11-C
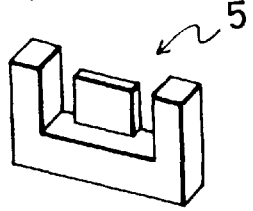
FIG.11-D
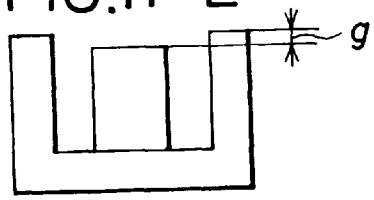
FIG.11-E

FIG.12-A
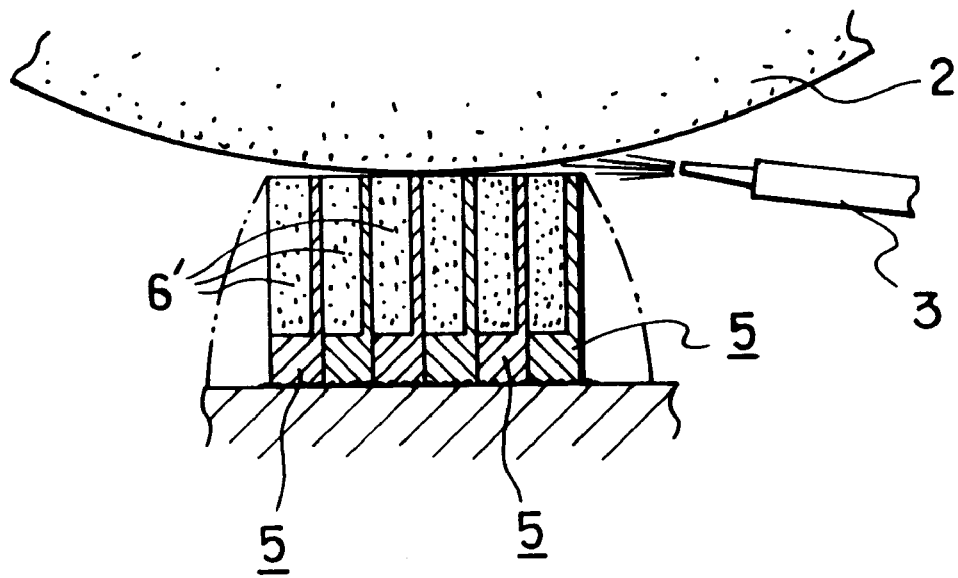
FIG.12-B
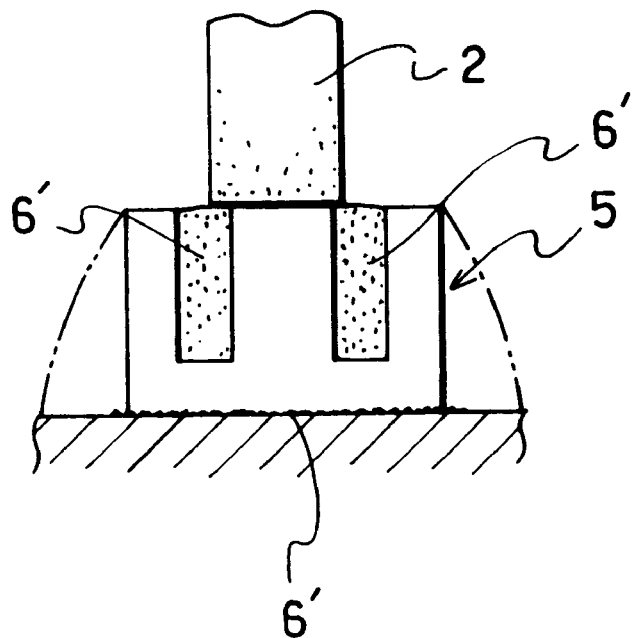

FIG.13-A
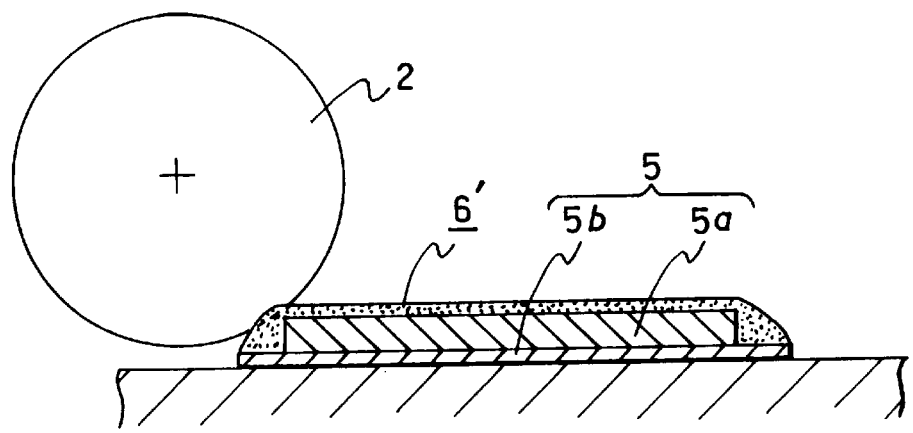
FIG.13-B
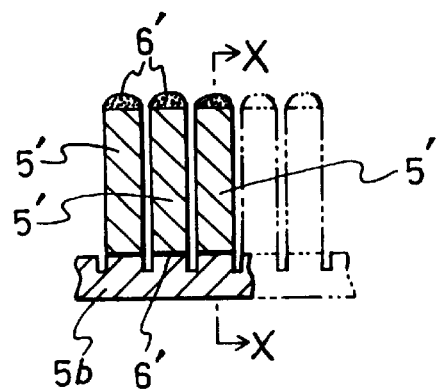
FIG.13-C
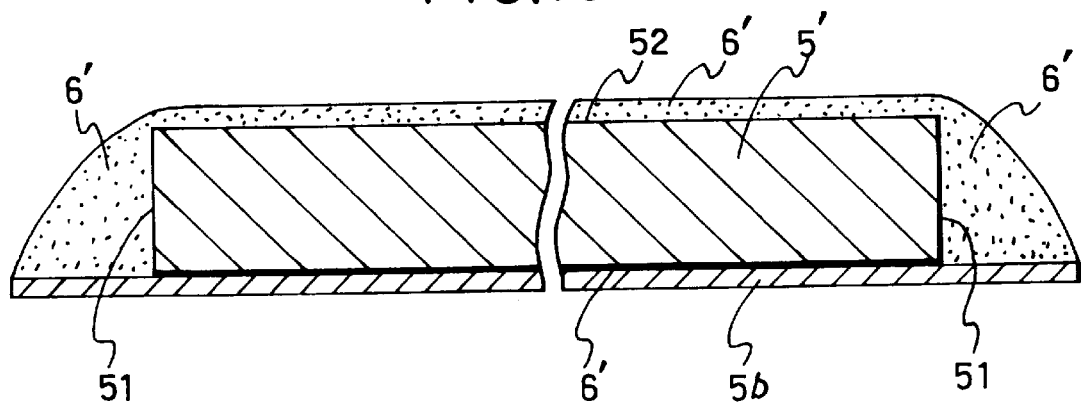

FREEZING CHUCK TYPE MACHINING METHOD

BACKGROUND OF THE INVENTION

This invention relates to a freezing chuck type machining method, and particularly to a method for fixing a workpiece in position by freezing a chucking medium.

When carrying out machining such as milling, grinding, turning, polishing, cutting, dicing, boring or engraving on a workpiece it is necessary to firmly fix (chuck) the workpiece to a machine tool table.

Conventionally, a magnetic chuck, a vacuum chuck or a vice has been used for this workpiece fixing, but there are limits on the materials and shapes of workpiece that can be chucked with these chucking devices, and there has been the problem that when the workpiece is thin or fragile or of a complex shape it is not possible to fix the workpiece certainly and stably.

As a solution to this, freezing chuck methods and devices using ice as an adhesive medium have been proposed. In this related art technology, water is coated in spray form onto a freezing plate made of a material having good thermal conductivity such as copper, a workpiece is placed on this and then the temperature of the top face of the freezing plate is reduced to below 0° C. by a current being passed through thermoelements disposed below the freezing plate and the water is thereby frozen and the work is fixed by a film of ice.

However, with this related art technology there have still been the following kinds of problem.

(1) It is difficult or impossible to machine using a machining liquid.

Heat of working produced between the workpiece and the tool during machining can severely damage the machined surfaces and also shorten the life of the tool. To avoid this, also in this method wherein the workpiece is fixed by freezing, it is preferable to use a machining liquid or a coolant liquid (hereinafter both referred to with the term machining liquid) as is done in general machining methods. However, the temperature of the machining liquid generally is higher than the temperature of the ice fixing the workpiece. Consequently, when machining liquid is supplied to the machining point the ice film is melted, and this is extremely dangerous because during machining the workpiece not only detaches from the fixing surface so that machining becomes impossible but also flies off the table.

When to avoid this a water-soluble machining liquid containing an antifreeze is used and this is cooled to below freezing point before use, because ice has a strong affinity for water the machining liquid still tends to melt the ice fixing the workpiece and releasing of the fixing of the workpiece readily occurs. For these reasons, in practice it has only been possible to apply freezing type chuck methods of the related art to dry machining, wherein no machining liquid is used.

(2) Movement of the tool tends to be obstructed by ice laminating onto the workpiece during machining.

For example when cutting or dicing of a workpiece is carried out, water from a water-soluble machining liquid or from the air freezes and forms a layer of ice on the workpiece during machining. Because this ice makes contact with the tool flange or mandrel and obstructs the movement of the tool, accurate machining becomes difficult and trouble such as damage to the tool or the main spindle has tended to occur.

(3) Compared with ordinary chucking means, the workpiece chucking and removal efficiency is poor and also the cost is high.

In the related art technology, water is frozen and the workpiece is fixed by a film of ice, but in practice it has not been possible to obtain a sufficient fixing strength without reducing the temperature of the top surface of the freezing plate to a temperature lower than −5°C., for example −10°C., and it has not been possible to remove the workpiece after machining without raising this temperature to above 0°C. Consequently, a long time of one to three minutes has been required for fixing of the workpiece on the freezing plate and also for removing the workpiece from the freezing plate.

As ways of overcoming this, conventionally the following kinds of method have been adopted. That is, a freezing chuck device additionally provided with a vacuum chuck function and a freezing chuck device not having a vacuum chuck function have been used and the former has been disposed on the table of the machine tool and the latter has been disposed off the machine tool. Several aluminum adaptor plates have been prepared in addition to these two freezing chuck devices, and a cycle wherein while a workpiece being machined is held using the freezing chuck device on the machine the next workpiece is fixed to an adaptor plate has been adopted.

That is, first, a film of antifreeze is formed on the top of the freezing plate of the freezing chuck device off the machine tool, water is coated onto the top of an adaptor plate placed on this and a workpiece is placed on this water, the freezing chuck device is then operated and the workpiece is thereby fixed in advance to the adaptor plate by freezing and is held on standby in this state. Then, when the machining of the workpiece on the machine tool has been finished the vacuum chuck of the freezing chuck device on the machine tool is operated to release an adaptor plate which had been fixed to that freezing chuck device by the vacuum chuck and the adaptor plate standing by as described above is placed on the freezing plate (on the top of which has been laid a film of antifreeze) of the freezing chuck device on the machine tool and fixed to this freezing plate by the vacuum chuck being operated.

However, with this method, two expensive devices, one for on the machine tool and one for off the machine tool, each essentially comprising a freezing plate, a thermoelement for reducing the temperature of the top surface of the freezing plate to a low temperature below −5°C., a plastic body provided with a cooling water passage for removing heat from the thermoelement and a mounting block on which the plastic body is mounted, are necessary. Consequently there has been the problem that the equipment cost doubles and running costs such as the cost of electric power consumed are also high. Furthermore, if the freezing plate of the freezing chuck device is not cooled to a temperature below 0° C. the workpiece slips out of position on the adaptor plate and machining by automatic control becomes difficult.

SUMMARY OF THE INVENTION

It is therefore a basic object of the present invention to provide a practical freezing chuck type machining method with which even in temperature conditions above 0° C. and in wet machining wherein a machining liquid is used it is possible to hold a workpiece firmly during machining and machine the workpiece highly accurately and yet workpiece chucking and removal can be carried out simply and efficiently.

It is another object of the invention to provide a freezing chuck type machining method with which it is possible to carry out sequential machining of a large number of workpieces efficiently and furthermore with cheap apparatus.

To achieve the above-mentioned objects and other objects, the invention provides a freezing chuck type machining method comprising interposing a macromolecular freezing agent whose freezing point is higher than that of water at least between a workpiece and a fixing surface and fixing the workpiece with the macromolecular freezing agent as an adhesive medium by cooling the fixing surface.

Also, the invention provides a freezing chuck type machining method for, using a pallet for supporting a workpiece and a freezing type chuck device having a fixing surface and means for controlling the temperature of the fixing surface, fixing the workpiece to the pallet and fixing the pallet to the freezing type chuck device and machining the workpiece, which method comprises interposing a macromolecular freezing agent whose freezing point is higher than that of water at least between the workpiece and the pallet and fixing the work with the macromolecular freezing agent as an adhesive agent by cooling the pallet.

The macromolecular freezing agent serving as a workpiece fixing element in this invention must have a low affinity for water and have good water repellency in addition to having a freezing point higher than that of water. Also, its specific gravity is preferably less than that of water.

Examples of such macromolecular freezing agents include silicone oils such as low molecular weight silicone oil and cyclic silicone oil and agents having these as main components.

This macromolecular freezing agent may be of any form, from liquid form to cream form (butter form) and paste form. A cream form or paste form freezing agent can be easily obtained by blending a viscosity adjuster (a thickener) consisting of solid particles into silicone oil. As the viscosity adjuster, powders and preferably fine powders of various substances can be used.

Besides cases wherein a liquid macromolecular freezing agent or a cream or paste form macromolecular freezing agent is used on its own, the invention also includes cases wherein macromolecular freezing agents of both these kinds are used together. When a cream or paste form macromolecular freezing agent is so coated that it connects the periphery of the workpiece and the fixing surface, the workpiece can be fixed very effectively.

A workpiece machined according to the invention can be of any material, for example a metal such as iron, copper, aluminum, titanium, silicon, germanium, or plastic, glass, carbon, a ceramic, wood, or a composite of two or more of these, or quartz, diamond, CBN, ruby or sapphire, and can be of any shape and dimensions.

The machining also can be any type of machining, for example any kind of grinding such as surface grinding, formation grinding, creep grinding and cylindrical grinding, and turning, polishing, cutting, slicing, dicing, milling, grooving, boring and engraving.

When the machining is surface machining, the workpiece may be directly fixed to a fixing surface or a pallet, but in the case of cutting or boring or the like wherein the tool passes all the way through the workpiece, an allowance plate for preventing the tool from making contact with the workpiece fixing surface is interposed between the actual workpiece and the fixing surface. This invention includes such cases, and accordingly in the present application 'workpiece' is a concept including both of course actual workpieces that are objects of machining and workpieces consisting of a workpiece proper and an allowance plate.

The invention also provides methods for carrying out sequential machining of a large number of workpieces.

A first such method comprises preparing at least first and second freezing type chuck devices each having a fixing surface and a cooling fluid passage for controlling the temperature of the fixing surface, disposing first and second circulating type cooling apparatuses for supplying cooling fluid on a machine tool and in a position off the machine tool, and sequentially repeating the following steps:

a. disposing a workpiece on the fixing surface of the first freezing type chuck device with a macromolecular freezing agent interposed between the fixing surface and the workpiece and connecting the first freezing type chuck device to the second circulating type cooling apparatus disposed in a position off the machine tool and fixing the workpiece to the first freezing type chuck device with the macromolecular freezing agent as an adhesive medium by cooling the macromolecular freezing agent to a temperature below its freezing point;

b. detaching the first freezing type chuck device with the workpiece fixed thereto from the second circulating type cooling apparatus and moving the first freezing type chuck device onto a table of the machine tool and mechanically fixing it thereto and connecting it to the first circulating type cooling apparatus and carrying out machining while keeping the macromolecular freezing agent at a temperature below its freezing point;

c. while carrying out said machining, disposing a workpiece to be machined next on the fixing surface of the second freezing type chuck device with a macromolecular freezing agent interposed between the fixing surface and the workpiece and connecting the second freezing type chuck device to the second circulating type cooling apparatus in a position off the machine tool and fixing the workpiece to the second freezing type chuck device with the macromolecular freezing agent as an adhesive medium by cooling the macromolecular freezing agent to a temperature below its freezing point;

d. after said machining, detaching the first freezing type chuck device from the first circulating type cooling apparatus and removing it from the table of the machine tool and detaching the second freezing type chuck device from the second circulating type cooling apparatus and moving it onto the table of the machine tool and mechanically fixing it thereto and connecting it to the first circulating type cooling apparatus and carrying out the next machining while keeping the macromolecular freezing agent at a temperature below its freezing point.

A second method for carrying out sequential machining of a large number of workpieces provided by the invention comprises disposing on a machine tool a freezing type chuck device having a fixing surface and means for controlling the temperature of the fixing surface and disposing a precooler in a position off the machine tool and sequentially repeating the following steps using a plurality of pallets:

a. disposing a workpiece on a first pallet with a macromolecular freezing agent interposed therebetween and placing the first pallet on the precooler held at a temperature below the freezing point of the macromolecular freezing agent and thereby fixing the workpiece to the first pallet with the macromolecular freezing agent as an adhesive medium;

b. removing the first pallet with the workpiece fixed thereto from the precooler and fixing it to the fixing surface of the freezing type chuck device and carrying out machining;

c. while carrying out said machining, placing a workpiece to be machined next on a second pallet with a macromolecular freezing agent interposed therebetween and placing the second pallet on the precooler and thereby cooling it and fixing the workpiece to the second pallet with the macromolecular freezing agent as an adhesive medium;

d. after said machining, removing the first pallet from the freezing type chuck device and removing the second pallet from the precooler and fixing it to the fixing surface of the freezing type chuck device.

The Invention Provides the Following Advantages.

According to the invention, a macromolecular freezing agent whose freezing point is higher than that of water is disposed between a workpiece and a fixing surface or a pallet placed on a fixing surface and the workpiece is fixed with this macromolecular freezing agent as an adhesive medium.

As a result, not only of course when the fixing surface is at below 0° C. but even when it is at a temperature above 0° C. it is possible to obtain a fixing strength amply sufficient to withstand strong machining forces. Also, because the time required to fix the workpiece by freezing is greatly reduced, it is possible to increase the efficiency of the workpiece fixing operation.

A macromolecular freezing agent whose freezing point is higher than that of water is used as the medium for holding the workpiece, and the macromolecular freezing agent has an extremely low affinity for water. As a result, even if a water-soluble or oily machining liquid containing antifreeze is sprayed or blown onto the tool and the workpiece there is absolutely no risk of the macromolecular freezing agent being melted and therefore there is no danger of the workpiece coming loose during machining and machining can be carried out safely. Also, because the medium fixing the workpiece does not melt even if machining liquid at a temperature above 0° C. is directed at the machining point in a concentrated manner, the effects of the machining liquid of removing heat of working, lubricating and removing chips and grindstone particles can be fully obtained, and it is possible to carry out accurate machining safely.

Also, because the temperature at which the machining liquid is used can be made relatively high, a cooling apparatus of a small capacity is sufficient for cooling the machining liquid. Furthermore, because the temperature of the workpiece is lower than when an ordinary chucking method is used, the amount of machining liquid used can be made small and as a result it becomes possible to employ a system wherein the machining liquid is not circulated through a filter and therefore filter circulating feed equipment can also be dispensed with. Consequently, it is possible to reduce equipment costs.

Also, because the macromolecular freezing agent has an extremely low affinity for water and is water repellent, even when cutting, dicing or slitting is carried out on a silicon wafer or a metal plate or the like, the phenomenon of water from machining liquid or the air freezing and forming a layer of ice on the surface of the workpiece and making contact with the tool flange or shaft directly above the tip, which has been a problem in cases wherein the workpiece is held with a film of ice, does not occur at all. Consequently, movement of the tool is always kept smooth and it is possible to carry out accurate machining smoothly.

Also, because as described above it becomes possible to use a machining liquid and fresh machining liquid can be supplied constantly to the area being machined to promote the removal of chips and detached grindstone particles, it is possible to make the finish of machined surfaces clean.

When a cream form or paste form macromolecular freezing agent made by dispersing solid particles into a base component is used, when the base component freezes it forms not a thin film but a block having a large volume, and also the solid particles work as a kind of aggregate. As a result, the adhesive holding strength with which the workpiece is held is very strong and even if the machining forces on the workpiece are large the workpiece can be kept in a stable fixed state.

In particular, when a cream or paste form macromolecular freezing agent is coated onto the periphery of the workpiece so that the lower part of the macromolecular freezing agent makes contact with the fixing surface and the macromolecular freezing agent is frozen in this state, because not only the bottom surface of the workpiece but also its periphery is held firmly by the rigid macromolecular freezing agent, even when the workpiece is sliced it does not detach from the fixing surface. Also, when a cream form or paste form macromolecular freezing agent is not only coated onto the periphery of the workpiece but also is coated so as to cover the top of the workpiece, slices of a sliced workpiece are strongly held by large-volume adhesive layers at both ends and a top surface layer connecting these like a bridge, and consequently even if the slices are thin they do not detach from the fixing surface and are kept in a stable state. This state is shown in FIG. 13-B and FIG. 13-C.

Also, whereas with conventional freezing chuck methods using ice it has taken a long time to chuck and remove the workpiece because in practice a sufficient fixing strength cannot be obtained unless the temperature of the ice is reduced to below −10° C., because the freezing point of the macromolecular freezing agent is higher than that of water it is possible to fix the workpiece to a fixing surface or a pallet even at a temperature above 0° C. and the temperature difference for chucking and removing the workpiece can be a small range of 5 or 6° C.

As a result of this it becomes possible to use a freezing type chuck device only capable of cooling to about 0 to 3° C., and the means for reducing the temperature of the fixing surface is not limited to thermoelements and can instead be a fluid such as water. In this case, because the freezing type chuck device need only be provided with a passage for the cooling fluid to flow through, it can be made a thin and light plate-shaped device so that it does not obstruct the movement of the tool when disposed on the table of the machine tool.

Therefore, when successively machining a large number of workpieces, if the above-mentioned first method is employed, without needing pallets it is possible to interchange freezing type chuck devices themselves as interchangeable jigs on the table of a machine tool, and workpieces can be simply and efficiently interchanged just by instantaneously connecting and disconnecting the freezing type chuck devices with respect to circulating type cooling apparatuses on and off the machine tool using quick connecting couplings. Workpieces having been machined can be removed from the machine tool while still fixed to the fixing surface of the freezing type chuck device, and subsequent handling is therefore easy.

Also when the above-mentioned second method is employed, the time required for chucking and removing workpieces with respect to the freezing type chuck device can be greatly reduced. In the case of this second method, all that is needed is one freezing type chuck device mounted on the machine tool and a precooler off the machine tool capable of cooling down to about 2 or 3° C. at the most, and a simple fluid circulating type precooler can be used for this. Therefore, in the case of this pallet circulating method also it is possible to greatly reduce apparatus costs.

When the macromolecular freezing agent (including cream or paste form agents in which viscosity adjusters having particularly high specific gravities are not blended) used in the invention has the property that its specific gravity is less than that of water, processing after use is also easy.

That is, if used macromolecular freezing agent only or this and the workpiece are put in water (which may contain other substances such as antifreeze) at a temperature higher than the freezing point of the macromolecular freezing agent, the macromolecular freezing agent separates from the water and floats on the surface of the water and this floating macromolecular freezing agent can be easily recovered by being poured into a tank containing water at a temperature lower than the freezing point of the macromolecular freezing agent. If this method is used, washing off of chips and the like adhered to the workpiece and recovery of the macromolecular freezing agent can be carried out by simple and cheap means.

BRIEF DESCRIPTION OF THE DRAWINGS

FIG. 4-A is a sectional view of a different version of the apparatus shown in FIG. 3;

FIG. 4-B is a plan view of the apparatus shown in FIG. 4-A;

FIG. 5-A is a sectional view showing a workpiece being fitted to a fixing surface plate in a case wherein a liquid macromolecular freezing agent is used;

FIG. 5-B is a sectional view showing this workpiece being machined;

FIG. 5-C is a view illustrating the state of this workpiece on completion of machining and illustrating recovery of the macromolecular freezing agent;

FIG. 6-A is a sectional view showing another example of a state of fixing of a workpiece with a macromolecular freezing agent;

FIG. 6-B is a sectional view showing another example of a state of fixing of a workpiece with a macromolecular freezing agent;

FIG. 6-C is a sectional view showing another example of a state of fixing of a workpiece with a macromolecular freezing agent;

FIG. 6-D is a sectional view showing another example of a state of fixing of a workpiece with a macromolecular freezing agent;

FIG. 7-A is a sectional view showing an example of a state of fixing of a workpiece with a macromolecular freezing agent in a case wherein an allowance plate is used;

FIG. 7-B is a sectional view showing another example of a state of fixing of a workpiece with a macromolecular freezing agent in a case wherein an allowance plate is used;

FIG. 7-C is a sectional view showing another example of a state of fixing of a workpiece with a macromolecular freezing agent in a case wherein an allowance plate is used;

FIG. 8-A is a view illustrating an initial stage in the machining of preceding workpieces in a case wherein the invention is applied to sequential machining according to a second method;

FIG. 8-B is a view illustrating an intermediate stage in the machining of these preceding workpieces;

FIG. 8-C is a view illustrating the preceding workpieces being interchanged with following workpieces;

FIG. 8-D is a view illustrating an example of a method for recovering macromolecular freezing agent and washing workpieces;

FIG. 9 is a view illustrating an initial stage in the machining of a preceding workpiece in an example wherein the invention is applied to sequential machining according to a first method;

FIG. 10-A is a perspective view showing the shape and dimensions of a workpiece in a preferred embodiment of the invention;

FIG. 10-B is a perspective view showing the shape and dimensions of a workpiece in another preferred embodiment of the invention;

FIG. 11-A is a perspective view showing the shape of a workpiece before it is machined in another preferred embodiment of the invention;

FIG. 11-B is a front view showing the dimensions of the workpiece shown in FIG. 11-A;

FIG. 11-C is a plan view showing the dimensions of the workpiece shown in FIG. 11-A;

FIG. 11-D is a perspective view showing the workpiece shown in FIG. 11-A after it is machined;

FIG. 11-E is a front view of the workpiece shown in FIG. 11-D;

FIG. 12-A is a sectional side view showing the workpiece of FIG. 11-A being machined;

FIG. 12-B is a front view showing the workpiece of FIG. 11-A being machined;

FIG. 13-A is a sectional side view showing a workpiece being machined in another preferred embodiment of the invention;

FIG. 13-B is a partially sectional side view showing enlarged the state of the workpiece of FIG. 13-A; and FIG. 13-C is a sectional view on the line X—X in FIG. 13-B.

DETAILED DESCRIPTION OF THE PREFERRED EMBODIMENTS

Figure 1:
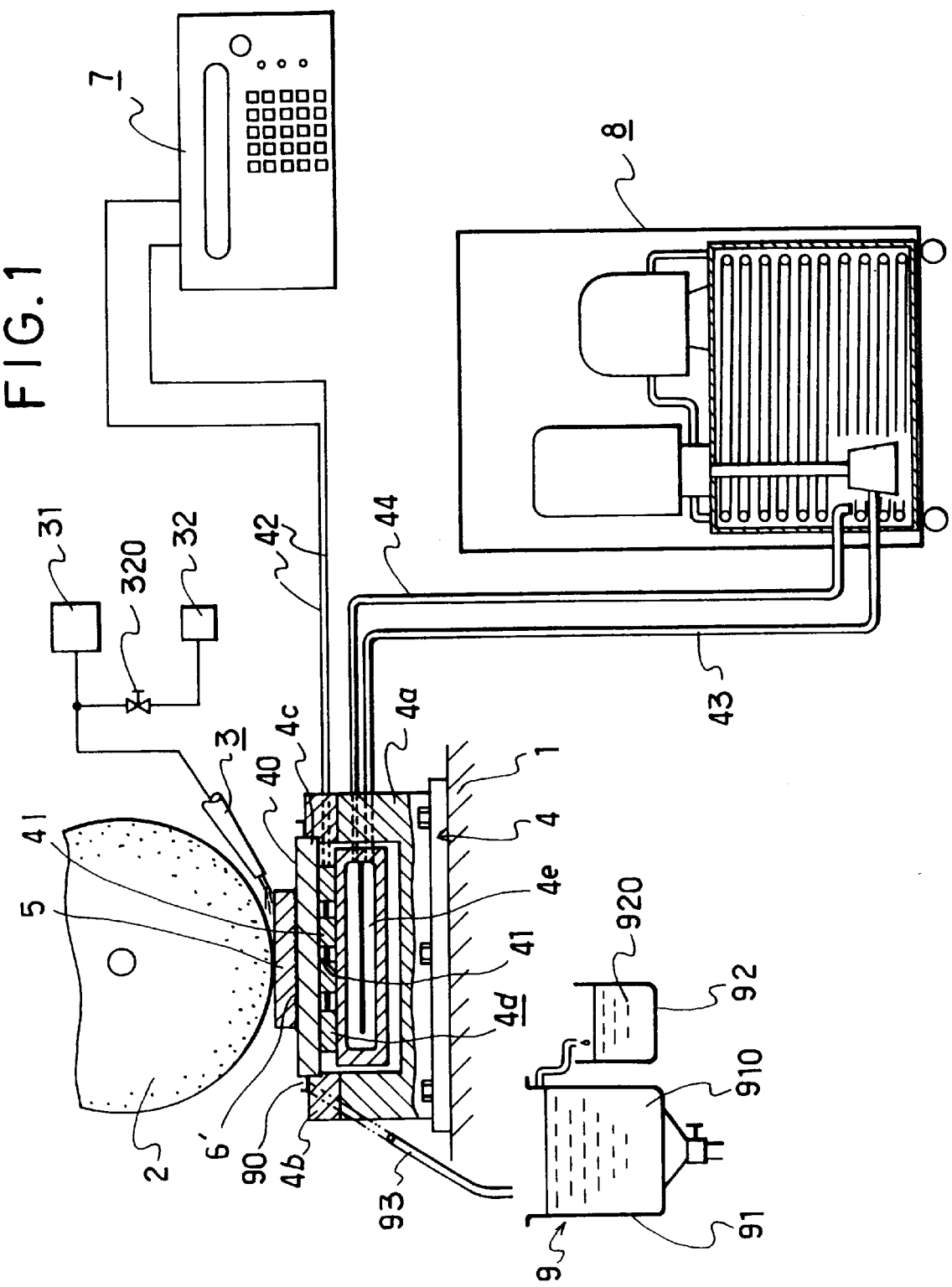
FIG. 1 is a view illustrating a first example of a freezing chuck type machining method according to the invention.

FIG. 1 illustrates a first example of a freezing chuck type machining method according to the invention. In this example, machining is carried out with a workpiece directly fixed to a fixing surface. The reference numeral 1 denotes a work table; 2 a tool such as a grinding wheel, a cutting tool, a reamer, a drill or a tap; 3 machining liquid supplying means; and 5 a workpiece.

The reference numeral 4 denotes a freezing type chuck device made up of a base 4a mounted on the work table 1, a support plate 4b fixed to the top of this, a fixing surface plate 4c fixed to the support plate 4b and having a fixing surface 40 on its upper face, and temperature controlling means 4d disposed on the lower face side of the fixing surface plate 4c for raising and lowering the temperature of the fixing surface plate 4c.

The reference numeral 6 denotes a macromolecular freezing agent interposed between the workpiece 5 and the fixing surface 40.

The base 4a is made of a material having high strength, for example stainless steel, and the support plate 4b is made of a material having good thermal insulativity and good electrical insulativity, for example plastic. The fixing surface plate 4c is made of a material having good thermal conductivity, for example copper, aluminum or aluminum nitride.

The temperature controlling means 4d for controlling the temperature of the fixing surface plate 4c may be any suitable means. In this example a plurality of thermoelements 41 are used, and these thermoelements 41 are mounted in contact with the fixing surface plate 4c. The thermoelements 41 have the characteristic that they absorb heat from their upper face sides and emit heat from their lower face sides when a plus current is passed through them and absorb heat from their lower face sides and emit heat from their upper face sides when a minus current is passed through them.

Feed wires 42 of the thermoelements 41 are connected to an outside controller 7. The controller 7 has a DC power supply circuit and a control circuit, and the control circuit includes means for freely setting a preparation temperature, a machining temperature (cooling temperature) and a fixing release temperature (heating temperature) according to the nature of the machining and supplying currents of polarity and size corresponding to these set temperatures.

Since thermoelements 41 are being used, as described above, heat is emitted from the lower face sides of the thermoelements 41 and this heat is transmitted through the base 4a to the work table 1 during machining. To remove this heat, a heat removing cooling mechanism 4e is disposed in the vicinity of the thermoelements 41. This heat removing cooling mechanism 4e uses circulating cooling water, and in the example shown in FIG. 1 is constructed as a core; a supply pipe 43 and a return pipe 44 serving this heat removing cooling mechanism 4e are connected to a cooling water supply apparatus 8.

The machining liquid supplying means 3 has a nozzle 30 for supplying machining liquid to the machining point and a machining liquid supplying apparatus 31 for supplying machining liquid to the nozzle 30, and preferably a cooled compressed air supplying apparatus 32 is connected to the machining liquid supplying apparatus 31 system by way of a regulating valve 320.

The reference numeral 9 denotes recovering means for recovering the macromolecular freezing agent 6, and is made up of a channel-shaped or conduit-shaped receiver 90 surrounding the fixing surface plate 4c, a first water tank 91 connected to this receiver 90 by a passage element 93 such as a hose, and a second water tank 92 connected to an upper part of the first water tank 91. The second water tank 92 is filled with water (besides industrial-use water this may be water containing antifreeze or solvent) 910 at a temperature higher than the freezing point of the macromolecular freezing agent 6, and the second water tank 92 is filled with water 920 at a temperature lower than the freezing point of the macromolecular freezing agent 6.

Figure 2:
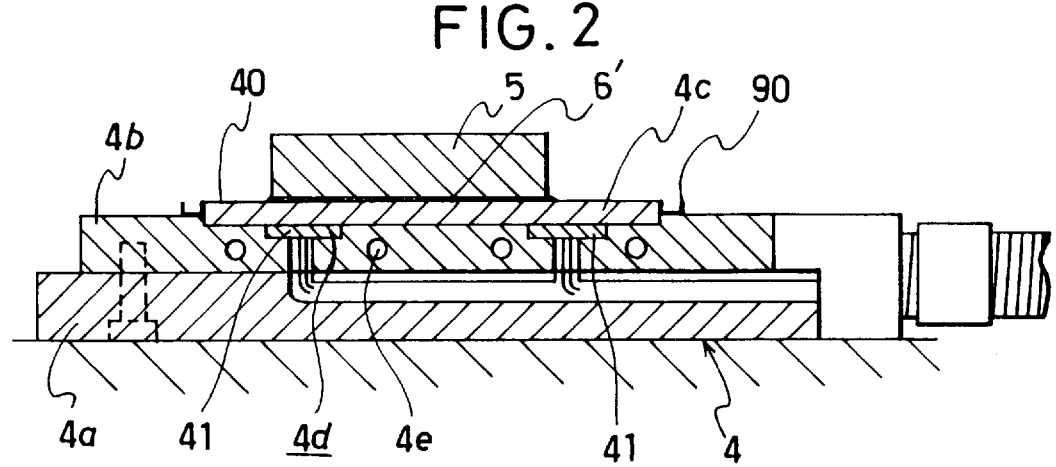
FIG. 2 is a sectional view of another example of a freezing type chuck device shown in FIG. 1.

FIG. 2 shows a different example of the freezing type chuck device 4; this freezing type chuck device is the same as that shown in FIG. 1 except that the heat removing cooling mechanism 4e through which cooling water, circulates is not a core but rather a passage.

Figure 3:
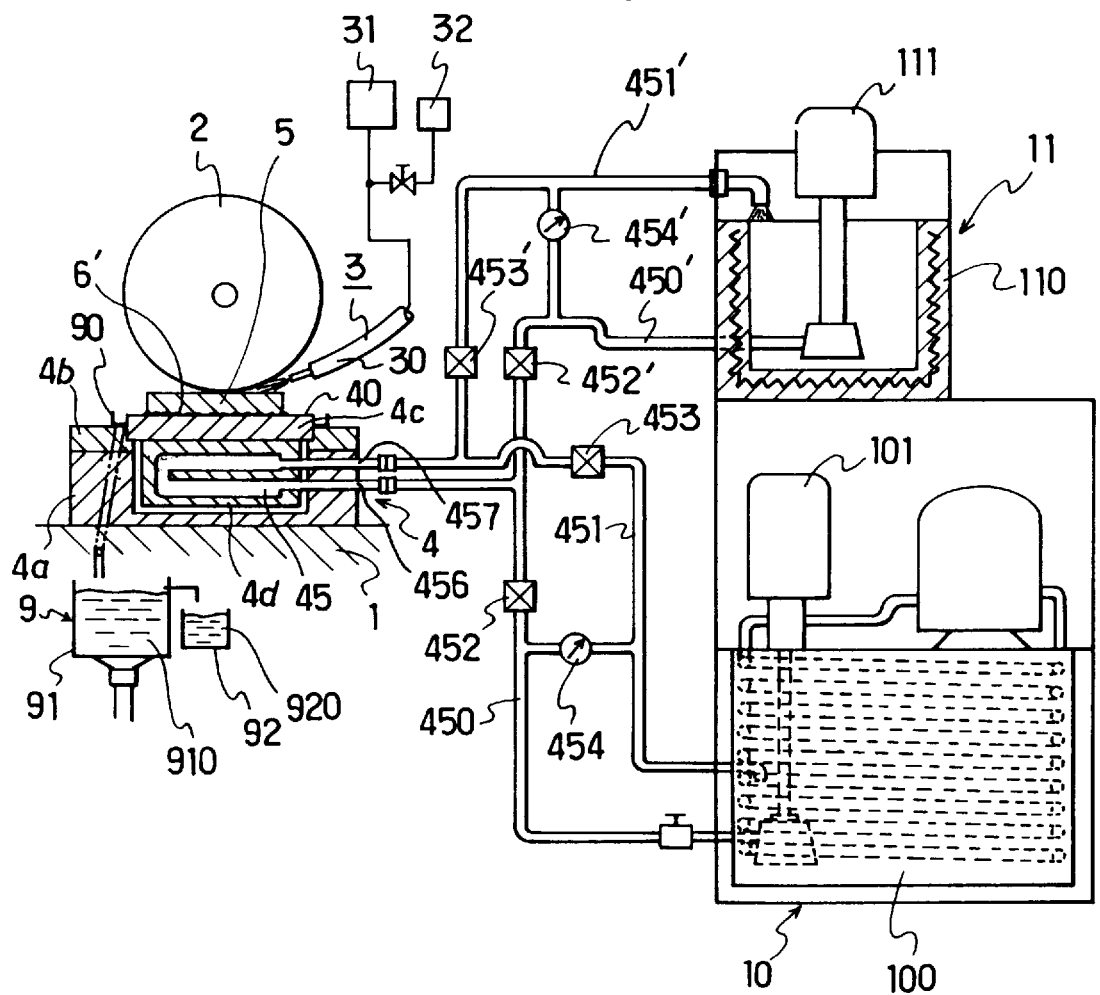
FIG. 3 is a view illustrating a second example of a freezing chuck type machining method according to the invention.

FIG. 3 illustrates a second example of a freezing chuck type machining method according to the invention. in this example also, a workpiece 5 is fixed directly to a fixing surface 40 for machining.

In this second example, as the medium controlling the temperature of the fixing surface plate 4c of the freezing type chuck device 4, instead of electricity-heat converting elements, a fluid is used. This is based on freezing the macromolecular freezing agent 6 whose freezing point is higher than that of water, and has the merit of enabling the apparatus to be made simple and cheap.

Accordingly, the temperature controlling means 4d of the fixing surface plate 4c of this freezing type chuck device 4 consists of a core 45 having inside it a fluid passage 450 and having its upper part in contact with the underside of the fixing surface plate 4c. Of course this may alternatively a snaking passage instead of a core.

An inlet pipe 456 and a discharge pipe 457 connected to the core 45 project to the outside through the base 4a or the support plate 4b and are respectively connected by joints to a supply pipe 450 and a return pipe 451, and the supply pipe 450 and the return pipe 451 are connected to a circulating type cooling apparatus 10 for freezing the macromolecular freezing agent.

The circulating type cooling apparatus 10 has a tank 100 having a refrigerating coil and also has a delivery pump 101; opening and closing valves 452, 453 of electromagnetic or other type are disposed in the supply pipe 450 and the return pipe 451 respectively, and upstream of these valves the supply pipe 450 and the return pipe 451 are connected to each other by way of a relief valve 454.

The supply pipe 450 and the return pipe 451 are respectively branched downstream of the opening and closing valves 452, 453 into a branch supply pipe 450' and a branch return pipe 451' connected to a circulating type warm water supplying apparatus 11 for unfreezing the macromolecular freezing agent.

This circulating type warm water supplying apparatus 11 has a warm water tank 110 having a heater and also has a warm water delivery pump 111; opening and closing valves 452', 453' of electromagnetic or other type are disposed in the branch supply pipe 450' and the branch return pipe 451', and upstream of these valves the branch supply pipe 450' and the branch return pipe 451' are connected to each other by way of a relief valve 454'.

In this example the opening and closing valves 452, 453 and 452', 453' are each separate, but of course they may alternatively be constituted by three position switch valves.

The rest of the construction of the example shown in FIG. 3 is the same as that of the first example shown in FIG. 1, and therefore the same parts have been given the same reference numerals and a description thereof will be omitted.

In the example of FIG. 3, as an element of the temperature controlling means 4d, a circulating type warm water supplying apparatus 11 is used, but this apparatus is not always necessary. FIG. 4-A and FIG. 4-B show an example wherein the second example described above is simplified and the freezing type chuck device 4 itself can be used as an easily movable jig.

The inlet pipe 456 and the discharge pipe 457 project to the outside through the base 4a or the support plate 4b and have plugs on their ends for mating with quick connecting couplings. The supply pipe 450 and the return pipe 451 of the circulating type cooling apparatus 10 respectively have quick connecting couplings 458, 459 on their ends so that they can be instantaneously connected to and disconnected from the inlet pipe 456 and the discharge pipe 457. The rest of the construction of this example is the same as that of the second example shown in FIG. 3, and therefore the same parts have been given the same reference numerals and a description thereof will be omitted.

In this invention, it is essential that the macromolecular freezing agent 6 have the property that its freezing point is higher than that of water by as much as possible and that it freezes at room temperature or at a temperature higher than room temperature. Preferably, in addition to this, it has the properties that its affinity for water is low (it exhibits water repellency) and its specific gravity is lower than that of water.

Typical examples of this kind of macromolecular freezing agent 6 include silicone resin, silicone oil such as for example low molecular weight silicone oil or cyclic silicone oil, and agents mainly consisting of this.

This silicone oil has as a frame siloxane bonds wherein silicon and oxygen are lined up alternately and its molecules are lined up in chains, and there are methyl (methyl polysiloxane, phenyl polysiloxane) and methyl phenyl (methyl phenyl polysiloxane) types including methyl groups and phenyl groups as organic radicals.

Low molecular weight silicone oil and cyclic silicone oil have the property of freezing at temperatures near room temperature, their thermal stability is also good and they also have the merit of having the characteristics of resistance to chemicals, resistance to oxidation and electrical insulativity.

This macromolecular freezing agent 6 is normally of liquid form or a form close to this. When it is in this form, before machining the macromolecular freezing agent 6 can be coated onto the fixing surface 40 or the underside of the workpiece 5 or onto both the fixing surface 40 and the workpiece 5. The film thickness is not limited, and an ample fixing effect can be obtained even with a thickness of a few microns.

FIG. 5-A through FIG. 5-C show stage by stage a method of fixing the workpiece 5 to the fixing surface plate 4c using a liquid form macromolecular freezing agent 6 and carrying out machining.

When machining is to be carried out, the fixing surface 40 of the fixing surface plate 4c is kept at a temperature higher than the freezing temperature of the macromolecular freezing agent. Then, as shown in FIG. 5-A, liquid form macromolecular freezing agent 6 is coated onto the fixing surface 40 by any method such as with a brush or a roller or by spraying to form a macromolecular freezing agent film on the fixing surface 40. Of course, the macromolecular freezing agent 6 may also be coated onto the underside of the workpiece 5.

Then, the workpiece 5 is placed on this macromolecular freezing agent film and after suitable adjustment of its position and orientation is carried out the temperature controlling means 4d is operated and reduces the temperature of the fixing surface 40 to a temperature lower than the freezing point of the macromolecular freezing agent.

In the case of the first example described above this is carried out by a plus current being passed through the thermoelements 41 from the controller 7 and the heat removing cooling mechanism 4e being operated at the same time, and in the case of the second example described above it is carried out by the opening and closing valves 452', 453' being closed and the opening and closing valves 452, 453 being opened and fluid being circulated from the circulating type cooling apparatus 10 through the supply pipe 450 to the core 45 and returned to the circulating type cooling apparatus 10 through the return pipe 451. In the third example described above it is carried out by the supply pipe 450 and the return pipe 451 of the circulating type cooling apparatus 10 being connected to the inlet pipe 456 and the discharge pipe 457 by means of the quick connecting couplings 458, 459.

As a result of this the macromolecular freezing agent 6 changes from the liquid phase to the solid phase by freezing and the workpiece 5 is strongly adhered to the fixing surface 40 by molecules of frozen macromolecular freezing agent 6'. Here, 'a temperature lower than its freezing point' means a temperature such that the frozen molecules of the macromolecular freezing agent bond finely and the fixing strength (holding strength) resulting from the adhesion of the fixing surface 40 and the workpiece 5 can fully withstand the loads acting on the workpiece 5 during machining, and in normal cases this is a temperature at least about 10° C. lower than the freezing point of the macromolecular freezing agent 6.

Since the workpiece 5 is now fixed, the machine tool is operated and a machining process is carried out on the workpiece 5 using a tool 2, as shown in FIG. 5-B. At this time, machining liquid is supplied to the contacting parts of the tool 2 and the workpiece 5 from the machining liquid supplying means 3.

This may be carried out by delivering machining liquid cooled to any temperature below the freezing point of the macromolecular freezing agent 6 through the nozzle 30 or by mixing cooled compressed air at for example a temperature below 0° C. and a pressure of 5 to 7 $kg/cm^2$ from the cooled compressed air supplying apparatus 32 with the machining liquid and spraying this from the nozzle 30 as a mist.

In the case of the latter method, because when the water is atomized it loses heat of vaporization, the cooling effect is higher, and with a small flow of machining liquid of for example 2 l/min or less it is possible to obtain an effect equivalent to the cooling effect of a flow of machining liquid of about 10 l/min or more used in the case of a mechanical chucking method.

Even if machining liquid at over 0° C. is used, because the frozen macromolecular freezing agent 6' has water repellency, the frozen macromolecular freezing agent 6' is not melted by the machining liquid and its frozen state is maintained and the workpiece 5 is kept firmly fixed. Consequently, due to the machining liquid, heat of working is carried away and machining waste and detached grindstone particles are smoothly removed from the areas being machined, the lubrication between the workpiece 5 and the tool 2 is also good and it is possible to obtain good machined surface states and accuracy.

Also, even if a machining liquid mixed with cooled and compressed air as described above freezes and becomes ice during machining, because the frozen macromolecular freezing agent 6' has water repellency, ice does not freeze and accumulate on the surface of the workpiece 5, and the tool 2 and the flange or mandrel of the tool 2 are not damaged and are kept in a clean state.

When the machining process is finished, the temperature controlling means 4d is operated and the temperature of the fixing surface 40 is returned to a temperature higher than the freezing point of the macromolecular freezing agent.

In the case of the first example described above this is carried out by a minus current being passed through the thermoelements 41 from the controller 7, and in the case of the second example described above it is carried out by the opening and closing valves 452, 453 being closed and the opening and closing valves 452', 453' being opened and warm water at a temperature above the freezing point of the macromolecular freezing agent being circulated from the circulating type warm water supplying apparatus 11 through the branch supply pipe 450' and the supply pipe 450 to the core 45 and returned to the circulating type warm water supplying apparatus 11 through the return pipe 451 and the branch return pipe 451'. In the case of the third example described above, it is carried out by the operation of the circulating type cooling apparatus 10 being stopped, the inlet pipe 456 and the discharge pipe 457 being disconnected from the supply pipe 450 and the return pipe 451 means of the quick connecting couplings 458, 459, and the fixing surface plate 4c of the freezing type chuck device 4 being exposed to a room temperature atmosphere.

In all of these cases, because as a result of the operation described above the macromolecular freezing agent 6 returns from the solid phase to the liquid phase, the fixing of the workpiece is released and the machined workpiece 5' can be removed from the fixing surface 40 as shown with a large arrow in FIG. 5-C.

The macromolecular freezing agent 6 having thus returned to the liquid phase is then swept off the fixing surface 40 together with chips and detached grindstone particles and so on with a suitable scraper or the like.

In the first through third examples described above, because the receiver 90 is disposed around the fixing surface plate 4c, the macromolecular freezing agent 6 is fed by this receiver 90 into the first water tank 91. This first water tank 91 is filled with water 910 at a temperature higher than the freezing point of the macromolecular freezing agent 6. Because the macromolecular freezing agent 6 has a lower specific gravity than water and has no affinity for water it separates from the water 910 and floats on the surface as shown in FIG. 5-C, and since chips and detached grindstone particles Z settle at the bottom of the first water tank 91 they can be easily separated.

Then, if the macromolecular freezing agent 6 is transferred from the first water tank 91 to the second water tank 92, since the second water tank 92 contains the water 920 at a temperature lower than the freezing point of the macromolecular freezing agent 6, the macromolecular freezing agent 6 freezes while floating on the surface of the water 920. Therefore, this macromolecular freezing agent 6 can be recovered by being scooped out of the second water tank 92 with a net or the like and can be reused.

However, the macromolecular freezing agent 6 of this invention is not limited to liquid form or a form close to liquid form. That is, it may alternately be of cream form or paste form. In this case, on freezing it forms not a film but a supporting block of large volume and can firmly fix the workpiece 5 by adhesion.

A cream form or paste form macromolecular freezing agent of this kind is preferably made by adding a viscosity adjuster consisting of solid particles to a base (for example silicone oil) and kneading this. The solid particles should be a powder and particularly one whose average particle diameter is 10 μm at the most, and preferably is a fine powder of average particle diameter below 1 μm and more preferably of average particle diameter below 0.5 μm.

The material of the solid particles is not limited, but generally preferable examples include earth powders such as diatomaceous earth, rice and wheat powders, starch and coral powders, wood ash, ash from burning paper or fibers, white carbon, zeolite and fly ash. Also, solid particles obtained by powdering any of the following can be used: ceramics, silicon, ferrite, carbon, graphite, glass, stone, quartz, plastic, cotton, wood, pulp, paper, and metals such as iron, copper and aluminum and their oxides.

For example, powders of diatomaceous earth and rice and wheat and starches can be recommended since because they consist of fine particles and have low specific gravities they can be uniformly dispersed in a base component (for example silicone oil) and do not readily separate, and furthermore they are cheap. However, other solid particles can also be easily used if they are mixed immediately before coating. It is also possible to use two or more of the above-mentioned solid particles mixed. Also, besides the solid particles a small amount of a liquid substance for promoting separation of the macromolecular freezing agent from the workpiece during washing of the workpiece after machining, for example a surface active agent, may be added.

As well as increasing the viscosity of the macromolecular freezing agent, the solid particles function as an aggregate in the same way as in the case of mortar or concrete when the macromolecular freezing agent is frozen, and the strength of the macromolecular freezing agent when frozen increases substantially in proportion to the amount of solid particles added. Therefore, at least about 5 wt% of solid particles are preferably added to the silicone oil constituting the base component. However, when the amount of solid particles added is too great, although the strength of the macromolecular freezing agent when frozen is high, its fluidity before freezing becomes poor and consequently it becomes difficult to apply. Therefore, an upper limit on the added amount of solid particles is preferably made 50 %. Generally, the ratio of silicone oil to solid particles (powder) should be set in the range (9:1) to (5.1:4.9), and according to this blend ratio of solid particles the form of the macromolecular freezing agent changes from close to a liquid to cream form to paste form.

This kind of cream form or paste form macromolecular freezing agent can be used on its own or together with the liquid form macromolecular freezing agent discussed above. FIG. 6-A through FIG. 6-D show some examples of this. In these figures, to facilitate understanding, liquid form macromolecular freezing agent is shown with the number 60 and cream form or paste form macromolecular freezing agent is shown with the number 600.

In FIG. 6-A, liquid form macromolecular freezing agent 60 is interposed between the underside of the workpiece and the fixing surface 40 and cream form or paste form macromolecular freezing agent 600 is coated so that it connects the side faces 51 of the workpiece 5 and areas of the fixing surface 40 within a predetermined distance from these side faces 51 so that the shape of the cross-section of the cream form or paste form macromolecular freezing agent 600 is roughly triangular. This state is suitable for machining wherein the workpiece is ground or polished.

In FIG. 6-B, cream form or paste form macromolecular freezing agent 600 is coated not only so that it connects the side faces 51 of the workpiece 5 and areas of the fixing surface 40 within a predetermined distance from these but also so that it covers the top surface 52 of the workpiece 5. This state is suitable for machining wherein the workpiece is cut into thin slices. That is, when slice cutting has been carried out not only are the resulting thin slices of work adhered to the fixing surface 40 by the areas of their end faces but also they are held by macromolecular freezing agent connecting their end faces and their top surfaces in the shape of a bridge.

In FIG. 6-C, cream form or paste form macromolecular freezing agent 600 is coated between the underside of the workpiece 5 and the fixing surface 40 and is also coated so that it connects the side faces 51 of the workpiece 5 and areas of the fixing surface 40 within a predetermined distance from these. This state has the merit that even in cases wherein penetrative machining such as cutting or boring is to be carried out, because the cream form or paste form macromolecular freezing agent 600 between the underside of the workpiece 5 and the fixing surface 40 functions as an allowance plate, it is possible to dispense with an allowance plate, which will be further discussed later.

In FIG. 6-D, by cream form or paste form macromolecular freezing agent 600 being coated between the underside of the workpiece 5 and the fixing surface 40 and between the side faces 51 and the fixing surface 40 and also so that it covers the top surface 52 of the workpiece 5, the entire workpiece 5 is wrapped in cream form or paste form macromolecular freezing agent 600. This state has the merit that the effect of the state shown in FIG. 6-D and the effect of the state shown in FIG. 6-B are both obtained.

A cream form or paste form macromolecular freezing agent 600 is also useful in cases wherein a part of a workpiece 5 is to be machined such as in machining an E-type ferrite core, which will be further discussed later, by filling spaces around the area being machined and preventing damage caused by machining forces.

A cream form or paste form macromolecular freezing agent 600 can be coated by any means, for example brush coating, spatula coating or extrusion using an extrusion gun.

As mentioned above, the workpiece 5 may consist of a workpiece proper and an allowance plate. FIG. 7-A to FIG. 7-C show this in detail. The reference numeral 5b denotes an allowance plate of a hardness such that it does not obstruct machining by the tool 2, and generally a carbon or graphite plate is used. This allowance plate 5b is supported on the fixing surface. 40 with macromolecular freezing agent therebetween, and the actual workpiece that is the object of the machining (shown here with the reference numeral 5a) is supported on the top of the allowance plate 5b with macromolecular freezing agent therebetween. The support plate 4b has an area the same as or greater than that of the workpiece 5a.

FIG. 7-A shows an example wherein a liquid form macromolecular freezing agent 60 is used. In FIG. 7-B, liquid form macromolecular freezing agent 60 is interposed between the allowance plate 5b and the fixing surface 40 and the workpiece 5a is disposed on the allowance plate 5b with a coating of liquid form macromolecular freezing agent 60 therebetween, and also the side faces 51 of the workpiece 5a and the allowance plate 5b or the fixing surface 40 are connected by cream form or paste form macromolecular freezing agent 600. In FIG. 7-C, the top surface 52 of the workpiece 5a is also covered with cream form or paste form macromolecular freezing agent 600, and this is connected to cream form or paste form macromolecular freezing agent 600 on the workpiece side faces 51.

FIG. 8-A through FIG. 8-D illustrate another form of the invention, that is, an example of a method suitable for successively machining numerous workpieces 5 on a single machine tool.

In this method each workpiece 5 is not directly fixed to a fixing surface of a freezing type chuck device 4 but rather a pallet 14a is used separately as a jig and the workpiece 5 is fixed to this by means of a macromolecular freezing agent 6 and this pallet 14a is fixed to the fixing surface 40, and there is the merit that fixing and releasing of the workpiece 5 can be carried out more efficiently.

Explaining this in detail, a plurality of pallets 14a, 14a are used and a freezing type chuck device 4 of any of the first through third examples described above is used, and separately from this a precooler 13 is installed off the machine tool.

The pallets 14a, 14a are made of a material having good thermal conductivity, for example aluminum or aluminum alloy, and are plate-shaped or are pan-shaped having a peripheral wall around the edge, and each has an area large enough for a plurality of workpieces 5 to be disposed on it.

The precooler 13 has a construction wherein a cooling plate 131 is mounted on a base 130 made of a thermally insulating material and a core 132 having a passage for a cooling fluid such as water is disposed in contact with the underside of the cooling plate 131, and a fluid supply pipe 133 and a fluid return pipe 134 are connected to a circulating type cooling apparatus 13a of the same kind of construction as the cooling water supply apparatus 8 of the first example or the circulating type cooling apparatus 10 of the third example.

Explaining a machining method according to this form of the invention from an initial stage thereof, in the freezing type chuck device 4, when water is used as the pallet fixing medium, the temperature of the fixing surface 40 is raised by the temperature controlling means 4d to a temperature higher than the freezing point of water. Meanwhile, in the precooler 13, the circulating type cooling apparatus 13a is operated and a cooling fluid is circulated through the supply pipe 133 and the return pipe 134 to the core 132 and the cooling plate 131 is kept at a temperature lower than the freezing point of the macromolecular freezing agent, for example 1 to 50° C.

Then, as shown in the right hand side of FIG. 8-A, a macromolecular freezing agent 6 is coated onto the top face of a pallet 14a having a temperature higher than the freezing point of the macromolecular freezing agent or the macromolecular freezing agent 6 is coated onto one or a plurality of workpieces 5 and the workpieces 5 are placed on the top face of the pallet 14a.

This pallet 14a is then placed on the cooling plate 131 of the precooler 13. As a result, by way of the pallet 14a the macromolecular freezing agent 6 is cooled to a temperature lower than its freezing point and consequently the workpieces 5 are strongly fixed to the pallet 14a by an adhering force of frozen macromolecular freezing agent 6'.

The pallet 14a with the workpieces 5 thus fixed thereto by the frozen macromolecular freezing agent 6' is then placed on the fixing surface plate 4c of the freezing type chuck device 4. In the meantime, water has been coated onto the fixing surface 40 of the fixing surface plate 4c by spraying or the like. The temperature controlling means 4d is then operated by the controller 7, and the temperature of the fixing surface 40 is reduced to a predetermined temperature below the freezing point of water, for example −3° C., and held at this temperature. As a result, the pallet 14a with the workpieces 5 fixed thereto by the frozen macromolecular freezing agent 6' is fixed to the fixing surface plate 4c by ice.

This completes the preparation for machining, and machining can now be carried out with a tool 2 while machining liquid is supplied to the tool 2 and the part of the workpiece 5 being machined by the machining liquid supplying means 3 as described above.

In this case, the temperature of the machining liquid is preferably below −3° C., but because in this invention only a small flow of machining liquid need be used and furthermore the thermal insulativity of the frozen macromolecular freezing agent 6' itself is high, increase in the temperature of the pallet 14a is suppressed. Because of this, even if the temperature of the machining liquid is above 0° C., since the amount of heat absorbed from the fixing surface 40 by the freezing type chuck device 4 is much greater than the amount of heat from the machining liquid tending to raise the temperature of the workpieces 5 and the pallet 14a, the pallet 14a does not detach from the fixing surface plate 4c. Also, when the workpieces 5 are made of a ceramic or plastic, because they themselves are thermally insulating, detachment of the pallet 14a is prevented even more certainly.

In the meantime, macromolecular freezing agent 6 is coated as described above onto another pallet 14a, and workpieces 5 to be machined in the next cycle are placed on this pallet 14a. This is the state shown in FIG. 8-A.

Then, this pallet 14a is placed on the cooling plate 131 of the precooler 13 kept at a temperature below the freezing point of the macromolecular freezing agent 6 and as a result the workpieces 5 are fixed to the pallet 14a, and this pallet 14a stands by in this state. This is the state shown in FIG. 8-B.

When machining with the freezing type chuck device 4 is finished, the controller 7 operates the temperature controlling means 4d to raise the temperature of the fixing surface 40 and return it to the above-mentioned preparation temperature (1° C.) or a temperature 1° C. higher than this. As a result, the pallet 14a holding the machined workpieces 5 can be removed from the freezing type chuck device 4. This state is shown in FIG. 8-C.

Then, if water is sprayed on the fixing surface 40 and the pallet 14a of the next lot standing by on the cooling plate 131 of the precooler 13 is set on the fixing surface 40 and the temperature controlling means 4d is again controlled by the controller 7 to lower the temperature of the fixing surface 40 to the temperature for freezing, the next machining process can be started immediately and also the workpieces of the following lot can be set on a pallet with macromolecular freezing agent therebetween and this pallet set on the precooler 13 to fix these workpieces in preparation for their machining.

In this method, because the workpieces 5 are fixed to the pallet 14a by a macromolecular freezing agent 6 having a high freezing point, the precooler 13 can be of a low cooling capacity and therefore it is possible to greatly reduce equipment costs, and because it is not water that is being frozen it is not necessary to coat antifreeze on the underside of the pallet and the operation is easy.

Also, although water is being used as a freezing medium in the freezing type chuck device 4, because the controlling temperature change can be made a small change of about 5° C., the time taken for chucking and releasing workpieces with respect to the freezing type chuck device 4 can be made an extremely short time of 10 to 15 seconds.

Furthermore, since even after they have been removed from the freezing type chuck device 4 the workpieces 5 are kept fixed to the pallet 14a by the frozen macromolecular freezing agent 6' having a high freezing point, they do not fall off the pallet as a result of vibration or the like and handling such as carrying of the workpieces at this time is easy.

After this it is only necessary to wash the workpieces 5, and at this time recovery of the macromolecular freezing agent 6 can also be carried out simultaneously, making use of its properties of having a specific gravity lower than that of water and having no affinity for water and having a freezing point higher than that of water.

That is, for example as shown in FIG. 8-D, means 9' for washing and recovering this macromolecular freezing agent 6 has a first water tank 91 containing water (which may contain a solvent) 910 held at a temperature higher than the freezing point of the macromolecular freezing agent by means of heating means 912 such as a heater and has a second water tank 92 containing water 920 kept at a temperature lower than the freezing point of the macromolecular freezing agent by means of a cooling mechanism 922, and the first water tank 91 is provided with a takeoff part 914 disposed at a higher level than the surface of the water in this first water tank 91.

When this means is used, a pallet 14a removed from the freezing type chuck device 4 is dropped into the first water tank 91. When this is done, because the water 910 in the first water tank 91 is at a temperature higher than the freezing point of the macromolecular freezing agent, the fixing of the workpieces 5 is quickly released and the workpieces 5 are washed by the water 910, and chips and detached grindstone particles and so on settle at the tank bottom because their specific gravities are large and are removed through a discharge part 915. After being left for a while after washing, the water 910 and the macromolecular freezing agent 6 separate and the macromolecular freezing agent 6 forms a thick film floating on the surface of the water.

If a valve of the takeoff part 914 is then opened, because the macromolecular freezing agent 6 is molten and therefore fluid it flows into the second water tank 92, and since the water 920 in this second water tank 92 is at a temperature lower than the freezing point of the macromolecular freezing agent the macromolecular freezing agent 6 instantaneously freezes at the surface of the water 920. It is then only necessary to scoop out this frozen macromolecular freezing agent 6' with suitable takeout means 93 such as a net or a scoop and transfer it to a container for reuse.

The washing and recovery means may of course have inside it carrying means such as a conveyor.

In the above description, a liquid macromolecular freezing agent is used as the macromolecular freezing agent 6, but this is just an example and the method also of course includes the use of liquid and cream or paste form macromolecular freezing agents of the kind shown in FIG. 6-A through FIG. 6-D and FIG. 7-A through FIG. 7-C in combination and the use of a cream form or paste form macromolecular freezing agent alone. In these cases, the fixing surface 40 shown in FIG. 6-A through FIG. 6-D and FIG. 7-A through FIG. 7-C may be read as the top surface of the pallet 14a.

Instead of water, the macromolecular freezing agent 6 may be used as the medium for fixing the pallet to the freezing type chuck device 4. In this case, the macromolecular freezing agent 6 is coated onto the fixing surface plate 4c of the freezing type chuck device 4 and the pallet 14a is set on this and the fixing surface 40 of the fixing surface plate 4c is cooled by the temperature controlling means 4d to a temperature below the freezing temperature of the macromolecular freezing agent 6 and the pallet 14a is fixed by the resulting freezing of the macromolecular freezing agent 6.

When a pallet is used, the fixing surface plate 4c of the freezing type chuck device 4 may be further provided with a vacuum chuck mechanism. In this case, the pallet 14a can be fixed to the fixing surface plate 4c more certainly and can be released more quickly.

FIG. 9 illustrates another form of the invention suitable for machining workpieces successively. In this form of the invention, pallets are not used and the freezing type chuck device 4 itself is used as an interchangeable jig, and there is the merit that fixing and releasing of workpieces 5 can be carried out efficiently and cheaply.

In this case, two or more fluid circulating type freezing type chuck devices of the kind shown in FIG. 4-A and FIG. 4-B are used as freezing type chuck devices 4, and a first circulating type cooling apparatus 10a and a second circulating type cooling apparatus 10b of the kind of construction shown in FIG. 4-A and FIG. 4-B are respectively disposed on or near a machine tool A and off the machine tool A.

In the case of this method, a first freezing type chuck device 4 is disposed off the machine tool and one or a plurality of workpieces 5 are disposed on the fixing surface 40 of this freezing type chuck device 4 with macromolecular freezing agent 6 therebetween.

Then, the inlet pipe 456 and the discharge pipe 567 of the first freezing type chuck device 4 are connected by means of the quick connecting couplings 458, 459 to the supply pipe 450 and the return pipe 451 of the second circulating type cooling apparatus 10b disposed off the machine tool. The second circulating type cooling apparatus 10b is then operated and by cooling fluid being circulated through the passage of the freezing type chuck device 4 the macromolecular freezing agent 6 is cooled to a temperature below its freezing point, for example a temperature in the range 2 to 5° C. This fixes the workpiece 5 and adheres it firmly to the fixing surface 40 of the first freezing type chuck device 4.

Next, the freezing type chuck device 4 is disconnected from the second circulating type cooling apparatus 10b and moved to the work table 1 of the machine tool A, and fixed to the work table 1 by means of a conventional mechanical chuck mechanism. Also, the inlet pipe 456 and the discharge pipe 567 are connected by means of quick connecting couplings 458, 459 to the supply pipe 450 and the return pipe 451 of the first circulating type cooling apparatus 10a. Because this operation is simple and can be carried out in a short time, the fixing of the workpiece 5 is not released.

In this state, machining is carried out on the workpiece with a tool (not shown) fitted to the machine tool A. During this machining, a workpiece 5 to be machined next is disposed on the fixing surface 40 of a second freezing type chuck device 4 prepared off the machine tool. This second freezing type chuck device 4 is then connected by means of the quick connecting couplings 458, 459 to the supply pipe 450 and the return pipe 451 of the second circulating type cooling apparatus 10b disposed off the machine tool, by subsequent freezing of the macromolecular freezing agent 6 the workpiece is firmly adhered to the fixing surface 40, and this second freezing type chuck device 4 then stands by in this state. This state is shown in FIG. 9.

When machining of the workpiece on the machine tool A is finished, the first freezing type chuck device 4 on the work table is disconnected from the first circulating type cooling apparatus 10a and the first freezing type chuck device 4 is transferred to an area where workpiece removal and washing steps are carried out, and the second freezing type chuck device 4, which is off the machine tool, is disconnected from the second circulating type cooling apparatus 10b and disposed on the work table 1 and fixed to the work table 1 by means of a conventional mechanical chuck mechanism and connected to the first circulating type cooling apparatus 10a by means of the respective quick connecting couplings 458, 459. Machining of the next workpiece can then be started immediately.

Thereafter, by repeating the operation described above it is possible to carrying out successive machining of a large number of workpieces efficiently, taking full advantage of the merits of the freezing type fixing method. This disposition of the workpiece on the fixing surface 40 of FIG. 9 may be carried out in any of the ways illustrated in FIG. 5-A, FIG. 6A through FIG. 6-D and FIG. 7-A through FIG. 7-C.

Preferred Embodiments

Specific preferred embodiments of the invention will now be presented.

First Preferred Embodiment

As a macromolecular freezing agent, low molecular weight silicone oil consisting mainly of cyclic polymethyl siloxane was used.

The characteristics of this macromolecular freezing agent were that it was a colorless, transparent liquid of viscosity (at 25° C.) 2.4 cSt($m^2$/S), freezing point 17° C., refractive index (at 25° C.) 1.394, surface tension 19.0{1.90}dyn/cm{MN/cm} and specific gravity (at 25° C.) 0.95.

The chucking strength of this macromolecular freezing agent when the temperature of the fixing surface and the workpiece was 50° C., the chuck material was copper and the workpiece material was a cemented carbide was 11 to 15 kg/$cm^2$ in the vertical direction and 8 to 12 kg/$cm^2$ in the shear direction. Thus it was found that the workpiece fixing temperature with this macromolecular freezing agent should be set to 5° C. or in a temperature range suitably lower than this.

1) Using this macromolecular freezing agent and using a freezing type chuck device of the kind shown in FIG. 1, slice machining of a microwave dielectric ceramic element was carried out.

2) The fixing surface plate of the freezing type chuck device was made of copper and was 300×150 mm in size.

3) The material of the workpiece was PZT barium titanate and its dimensions as shown in FIG. 10-A were 50(W)×50(L)×2(t)mm, and this was made 5(W)×5(L)×2(t)mm.

A slicing machine was used as the machine tool, and the machining conditions were made: tool: resinoid bond diamond grindstone (grade #600), tool dimensions: external diameter 100 mm, thickness 0.4 mm, tool feed rate: 500 mm/min, tool speed: 5000 rpm, machining direction: down cut.

4) Before machining, the temperature of the fixing surface of the fixing surface plate was kept at 20° C., the above-mentioned macromolecular freezing agent was coated onto the fixing surface in this state to a thickness of about 2 μm, the workpiece was placed on this, a plus current was passed through the freezing type chuck device and the temperature of the chucking surface was thereby lowered to 1° C., and this state was maintained. As a result, the macromolecular freezing agent froze and the workpiece was fixed immovably.

5) During machining, a needle nozzle of 1 mm in diameter was used as machining liquid supplying means and a grinding liquid cooled to about 3° C. was directly delivered at about 150 cc/min through this nozzle at the contacting parts of the workpiece and the tool from in front thereof in the direction of advance of the tool.

6) As a result, the macromolecular freezing agent did not melt, the workpiece was kept in a stable fixed state, there was absolutely no occurrence of cracking or chipping on the sliced cut faces, and clean shear faces were obtained.

After the machining, the temperature of the fixing surface was raised to 20° C. and the workpiece was removed and macromolecular freezing agent and chips and detached grindstone particles were swept off the chucking surface and transferred into a first water tank containing water at 20° C. As a result of this the macromolecular freezing agent separated and floated, and when it was poured into an adjacent second water tank containing water kept at 10° C. the macromolecular freezing agent froze and almost all of it was recovered.

7) For comparison, the same machining was carried out by a conventional method. In this case, water was sprayed onto the fixing surface and the workpiece was placed on that and a plus current was passed through the freezing type chuck device to bring the fixing surface to −10° C. and this was maintained throughout the machining. This freezed the water and fixed the workpiece.

When at the start of machining grinding liquid was used under the above-mentioned conditions, the ice melted and the fixing of the workpiece was released and machining became impossible. In an attempt to avoid this, an air mist including about 5% water was sprayed at a pressure of 5 kg/cm$^2$ onto a part displaced by 180° from the part being cut by the tool (the grindstone) and air cooled to about −10° C. was blown directly at the part being cut. Although this time the ice did not melt, cracking due to grinding heat occurred in the lower sides of the cut surfaces of the sliced workpiece and when scratched with a fingernail these surfaces flaked off and thus the workpiece was defective and unusable.

Second Preferred Embodiment

1) A composite material made of aluminum and plastic was cut with a machine tool according to the invention.

The material was a composite of aluminum A2011 and epoxy resin, the dimensions of upper and lower aluminum sheets of the composite material were 300(W)×200(L)×2(t) mm, and the dimensions of a middle plastic sheet of the composite material were 300(W)×200(L)×0.1(t)mm, and the overall dimensions of the composite material after machining were 300(W)×6(L)×4.1(t)mm (see FIG. 10-B).

2) The machine tool was a fine slicing machine, the tool used was a 100 mm diameter disc fitted with three 10 mm long, 1 mm thick diamond tools, the tool speed was 6000 rpm, the tool feed rate was 120 mm/min and the machining direction was made down cut.

The same macromolecular freezing agent as in the first preferred embodiment was used, and a fluid-cooled/heated freezing type chuck device of the kind shown in FIG. 3 was used.

3) For the machining, warm water at 20° C. was supplied to the core of the freezing type chuck device from a circulating type warm water supplying apparatus, the macromolecular freezing agent was coated onto the fixing surface to a thickness of about 2 μm, the workpiece was placed on this and then the liquid circuit was switched so that cold water was supplied from a circulating type cooling apparatus and the temperature of the fixing surface was thereby lowered to 2° C., and this state was maintained. As a result, the macromolecular freezing agent froze and the workpiece was fixed immovably.

4) A mixture obtained by feeding a water-soluble machining liquid (containing antifreeze) cooled to about −5° C. under pressure at 150 cc/min and mixing into this 280 l/min of air cooled to about −10° C. with an air cooler was used as the machining liquid, and using a 4 mm diameter needle nozzle this was directly delivered to the machining point from in front thereof in the direction of advance of the tool at a pressure of about 5 kg/cm$^2$.

5) As a result, the macromolecular freezing agent did not melt and the workpiece was kept in a stable fixed state, the plastic material sandwiched in the middle of the workpiece did not melt at all and the cut surfaces of the cut workpiece were mirrorlike surfaces of surface roughness below 0.2s. The machining liquid did not freeze and form a layer on the workpiece during machining, the movement of the tool was smooth and the dimensional accuracy of the cut product was good.

6) When for. comparison the workpiece was fixed by freezing water under the same conditions as in the first preferred embodiment and cutting was carried out under the machining conditions and machining liquid conditions described above, during the machining the workpiece came off the chuck and machining became impossible. This was because although the machining liquid was at a low temperature below 0° C., because it contained antifreeze having a high affinity for water, the ice adhering the workpiece to the fixing surface was melted by the machining liquid.

Also, even during the period over which machining was possible, water from the machining liquid and from the air froze and formed a layer on the workpiece and this made contact with the flange of the tool and consequently the rotation of the tool became unstable and the cutting accuracy fell.

Third Preferred Embodiment

1) Gap grinding of an E-shaped ferrite core with a thin middle leg was carried out according to the invention.

The workpiece was of the shape shown in FIG. 11-A, and its dimensions as shown in FIG. 11-B were: height h=8 mm, overall width W=15 mm, width $W_1$ of the left and right legs=2 mm and thickness t, thereof=3 mm, width $W_2$ of the middle leg=7 mm and thickness $t_2$ thereof=0.6 mm. Machining to form a gap g by grinding 0.4 mm off the height h of the middle leg was carried out to make a product of the shape shown in FIG. 11-D and FIG. 11-E.

2) The machine tool used was a surface grinding machine with a creep function, a 200 mmφ resinoid bond diamond grindstone (grade #400) was used as the tool and the machining conditions were: grindstone speed: 2700 rpm, grindstone feed rate: 600 mm/min, machining mode: creep machining, down cut.

The same macromolecular freezing agent as in the first preferred embodiment was used, and a fluid-cooled/heated freezing type chuck device of the kind shown in FIG. 3 was used.

3) For the machining, the temperature of the fixing surface of the fixing surface plate was kept at 20° C., the macromolecular freezing agent was coated onto the fixing surface in this state to a thickness of 3 μm, twenty units of the above-mentioned workpiece were disposed on this in contact with each other in a line as shown in FIG. 12-A and the spaces between the side legs and the middle legs were also filled with the macromolecular freezing agent; the freezing type chuck device was then operated and the temperature of the chucking surface thereby lowered to 1° C. and this state was maintained. As a result, the macromolecular freezing agent froze and the workpieces were fixed immovably, and also the spaces between the side legs and the middle legs were filled with frozen macromolecular freezing agent and the middle legs were thereby reinforced.

4) During machining, two 1 mm diameter needle nozzles were used as machining liquid supplying means, and grinding liquid cooled to about 3° C. was sprayed through these at about 150 cc/min directly at the grinding point from in front thereof in the direction of advance of the grindstone.

5) As a result, the macromolecular freezing agent did not melt and the workpieces were kept in a stable fixed state, the macromolecular freezing agent filling the gaps between the middle legs and the side legs also did not freeze and the thin middle legs remained firmly reinforced by this and fully withstood the machining resistance during cutting by the grindstone, and it was possible to carry out gap machining with good accuracy without any of the workpieces breaking.

6) For comparison, the workpieces were fixed to the fixing surface by freezing water under the same conditions as in the first and second preferred embodiments, the spaces between the side legs and the middle legs were filled with ice and gap machining was carried out with the conditions set forth above, but in this case the ice was melted by the machining liquid during machining and the middle legs broke and also the fixing of the workpieces themselves was released and machining became impossible.

Fourth Preferred Embodiment

1) Cutting machining was carried out using the form of the invention wherein pallets are used.

The same macromolecular freezing agent as in the first preferred embodiment was used. As the pallets, two pallets made of aluminum alloy and of dimensions 120(W)×130(L)×10(t)mm were used.

A freezing type chuck device of the kind shown in FIG. 1 was used. A circulating water type precooler having cooling plate dimensions of 100(W)×110(L)×50(t)mm was used as the precooler. The material of the workpiece used was PZT barium titanate and its dimensions were 50(W)×50(L)×1(t)mm.

2) For the machining, the preparation temperature of the chucking surface of the freezing type chuck device on standby was set to 1° C. and the temperature of the top surface of the cooling plate of the precooler on standby was kept at 2 to 3° C.

The macromolecular freezing agent was coated onto a pallet at room temperature to a thickness of about 2 μm and the workpiece was placed on this. The pallet in this state was then set on the precooler. As a result, the macromolecular freezing agent froze and the workpiece became strongly fixed to the pallet.

This pallet was set on the fixing surface at the abovementioned preparation temperature with water interposed therebetween, the freezing type chuck device was operated to lower the temperature of the fixing surface to −3° C., and this temperature was maintained. As a result, the pallet was fixed to the fixing surface.

A mixture obtained by feeding a water-soluble machining liquid (containing antifreeze) cooled to about −5° C. under pressure at 150 cc/min and mixing into this 280 l/min of air cooled to about −10° C. with an air cooler was used as the machining liquid, and using a 4 mm diameter needle nozzle this was directly delivered to the machining point from in front of the tool at a pressure of about 5 kg/cm².

During the machining, the workpiece was kept strongly fixed to the pallet and the pallet was also kept firmly fixed to the chucking surface, and consequently there was no chipping of the cut surfaces and clean cut surfaces were obtained.

3) Meanwhile, during this machining, the workpiece of the next lot was disposed on a pallet under the conditions described above and this pallet was set on the precooler at the above-mentioned temperature and the workpiece was fixed by freezing of the macromolecular freezing agent.

On completion of the above-mentioned machining, the temperature of the chuck surface of the freezing type chuck device was raised to 2° C., whereby the ice was melted and the fixing of the pallet was released.

After that, water was sprayed on the chuck surface and the pallet which had been set on the precooler was set on the fixing surface, the temperature of the fixing surface was lowered to −3° C. and this temperature was maintained. As a result the pallet was fixed to the fixing surface, and the next machining was started.

4) In this preferred embodiment, because the workpiece of the next lot was fixed by means of the macromolecular freezing agent to a pallet at a temperature exceeding 0° C. and furthermore the temperature difference for fixing and releasing the pallet in the freezing type chuck device 4 was about 5° C., it was possible to carry out chucking and removal of the workpiece with respect to the machine tool in the extremely short time of ten seconds.

5) Also, even when the pallet was removed from the freezing type chuck device, because the temperature of the pallet at that time was below the freezing temperature of the macromolecular freezing agent, the workpiece was integral with the pallet and handling was easy. Thereafter, while still fixed to the pallet the workpiece was dropped into a first water tank containing warm water at 20° C. whereby the workpiece was washed and the macromolecular freezing agent was made to separate and float to the surface of the water, and this floating molten macromolecular freezing agent was then transferred to a second water tank containing water at 10° C. In this way, the macromolecular freezing agent was made to freeze and could be smoothly recovered.

Fifth Preferred Embodiment

1) A samarium cobalt material was sliced with a multiple cutting grindstone according to the invention. The dimensions of the workpiece were 50(L)×25(W)×7(t)mm, and this was cut to 50(L)×1.5(W)×7(t)mm. The machine tool used was a slicing machine, and an electrodeposited diamond ten-blade multi-grindstone (grade #280) of tool diameter 100 mm, thickness 0.4 mm and blade pitch 2 mm was used as the tool. The machining conditions were: grindstone speed: 3000 rpm, tool feed rate: 20 mm/min, machining method: down cut.

2) A freezing type chuck device of the kind shown in FIG. 1 with a 240×50 mm fixing surface was used.

For the machining, the temperature of the fixing surface was kept at 20° C., and in this state, as shown in FIG. 13-A, the macromolecular freezing agent of the first preferred embodiment was coated onto the fixing surface, a 5 mm thick allowance plate made of carbon was placed on this, a paste form macromolecular freezing agent was coated on this allowance plate to a thickness of about 0.1 mm, the workpiece was placed on that and the paste form macromolecular freezing agent was then also coated onto the side faces and the top face of the workpiece.

As the paste form macromolecular freezing agent, a first type made by adding 30 wt % of diatomaceous earth of average particle diameter 0.01 μm to the low molecular weight silicone oil of the first preferred embodiment and kneading this and a second type made by adding 35 wt % wheat powder to the low molecular weight silicone oil of the first preferred embodiment and kneading this were used.

3) A plus current was passed through the freezing type chuck device in this state to lower the temperature of the fixing surface to 1° C., and this state was maintained. As a result, the first and second types of macromolecular freezing agent froze and the workpiece was fixed immovably and wrapped in the macromolecular freezing agent.

During the machining, grinding liquid cooled to about 3° C. was sprayed directly at the contacting parts of the workpiece and the tool at a flow rate of about 15 l/min.

4) As a result, during the slicing, notwithstanding that the workpiece was cut to a thin thickness of 1.5 mm, there was absolutely no peeling off and scattering of the work from the fixing surface and the work was kept in a stable fixed state.

When for comparison the same machining was carried out with the workpiece fixed using just the liquid macromolecular freezing agent of the first preferred embodiment, about 5% of the workpieces peeled off the fixing surface during machining and scattered.

The reason why these good results were obtained with this preferred embodiment is thought to be because the strength of the adhesive layer consisting of the frozen macromolecular freezing agent was higher due to the use of the paste form macromolecular freezing agent containing a fine powder and because the large-volume adhesive layers consisting of this frozen macromolecular freezing agent adhered to the fixing surface supported the ends of the workpieces during cutting and after cutting and furthermore the adhesive layers at the ends connected with the top layer of frozen macromolecular freezing agent on the top surface of the workpiece and formed a bridge.

A freezing chuck type machining method according to the present invention can be applied to the machining of any workpiece, irrespective of shape or material.

What is claimed is:

1. A freezing chuck type machining method for fixing and machining a workpiece using a freezing type chuck device having a fixing surface and means for controlling the temperature of the fixing surface, which method comprises interposing a macromolecular freezing agent selected from the group consisting of silicone oil and a liquid mainly consisting of silicone oil whose freezing point is higher than that of water at least between the workpiece and the fixing surface and fixing the workpiece with the macromolecular freezing agent as an adhesive medium by cooling the fixing surface.

2. A freezing chuck type machining method for fixing a workpiece to a pallet and fixing the pallet to a freezing type chuck device having a fixing surface and means for controlling the temperature of the fixing surface and means for controlling the temperature of the fixing surface and machining the workpiece, which method comprises interposing a macromolecular freezing agent selected from the group consisting of silicone oil and a liquid mainly consisting of silicone oil whose freezing point is higher than that of water at least between the workpiece and the pallet and fixing the workpiece with the macromolecular freezing agent as an adhesive medium by cooling the pallet.

3. A freezing chuck type machining method according to claim 1, wherein the workpiece comprises a workpiece comprises a workpiece proper and an allowance plate.

4. A freezing chuck type machining method according to claim 1, wherein silicone oil or a liquid mainly consisting of silicone oil is used as the macromolecular freezing agent.

5. A freezing chuck type machining method according to claim 1, wherein a cream or a paste made by mixing a viscosity adjuster into silicone oil is used as the macromolecular freezing agent.

6. A freezing type chuck machining method according to claim 1, wherein silicone oil or a liquid mainly consisting of silicone oil and a cream or a paste made by mixing a viscosity adjuster into silicone oil are used as the macromolecular freezing agent.

7. A freezing type chuck machining method according to claim 1, wherein a cream or a paste made by mixing a viscosity adjuster into silicone oil is so coated that it connects a peripheral surface of the workpiece and the fixing surface.

8. A freezing type chuck machining method according to claim 1, wherein a cream or a paste made by mixing a viscosity adjuster into silicone oil is so coated that it connects a peripheral surface and a top surface of the workpiece and the fixing surface.

9. A freezing type chuck machining method according to claim 1, wherein the silicone oil is a low molecular weight silicone oil whose freezing point is near room temperature.

10. A freezing type chuck machining method according to claim 1, comprising preparing at least first and second freezing type chuck devices each having a fixing surface and a passage for a cooling fluid for controlling the temperature of the fixing surface, disposing first and second circulating type cooling apparatuses for supplying cooling fluid respectively in the vicinity of a machine tool and in a position off the machine tool, and sequentially repeating the following steps:

a. disposing a workpiece on the fixing surface of the first freezing type chuck device with a macromolecular freezing agent interposed between the fixing surface and the workpiece and connecting the first freezing type chuck device to the second circulating type cooling apparatus disposed in the position off the machine tool and fixing the workpiece to the first freezing type chuck device with the macromolecular freezing agent as an adhesive medium by cooling the macromolecular freezing agent to a temperature below its freezing point;

b. detaching the first freezing type chuck device with the workpiece fixed thereto from the second circulating type cooling apparatus and moving the first freezing type chuck device onto a table of the machine tool and mechanically fixing it thereto and connecting it to the first circulating type cooling apparatus and carrying out machining while keeping the macromolecular freezing agent at a temperature below its freezing point;

c. while carrying out said machining, disposing a workpiece to be machined next on the fixing surface of the second freezing type chuck device with a macromolecular freezing agent interposed between the fixing surface and the workpiece and connecting the second freezing type chuck device to the second circulating type cooling apparatus disposed in a position off the machine tool and fixing the workpiece to the second freezing type chuck device with the macromolecular freezing agent as an adhesive medium by cooling the macromolecular freezing agent to a temperature below its freezing point; and d. after said machining, detaching the first freezing type chuck device from the first circulating type cooling apparatus and removing it from the table of the machine tool and detaching the second freezing type chuck device from the second circulating type cooling apparatus and moving it onto the table of the machine tool and mechanically fixing it thereto and connecting it to the first circulating type cooling apparatus and carrying out the next machining while keeping the macromolecular freezing agent at a temperature below its freezing point.

11. A freezing chuck type machining method according to claim 2, comprising disposing on a machine tool a freezing type chuck device having a fixing surface and means for controlling the temperature of the fixing surface and disposing a precooler in a position off the machine tool and sequentially repeating the following steps using a plurality of pallets:

a. disposing a workpiece on a first pallet with a macromolecular freezing agent interposed therebetween and fixing the workpiece to the first pallet with the macromolecular freezing agent as an adhesive medium by placing the first pallet on the precooler while holding the precooler at a temperature below the freezing point of the macromolecular freezing agent;

b. removing the first pallet with the workpiece fixed thereto from the precooler and fixing it to the fixing surface of the freezing type chuck device and carrying out machining;

c. while carrying out said machining, placing a workpiece to be machined next on a second pallet with macromolecular freezing agent interposed therebetween and placing the second pallet on the precooler and cooling it and fixing the workpiece to the second pallet with the macromolecular freezing agent as an adhesive medium; and d. after said machining, removing the first pallet from the freezing type chuck device and removing the second pallet from the precooler and fixing it to the fixing surface of the freezing type chuck device.

12. A freezing chuck type machining method according to claim 2, wherein the workpiece comprises a workpiece proper and an allowance plate.

13. A freezing type machining method according to claim 2, wherein a cream or a paste made by mixing a viscosity adjuster into silicone oil is used as the macromolecular freezing agent.

14. A freezing type machining method according to claim 2, wherein silicone oil or a liquid mainly consisting of silicone oil and a cream or a paste made by mixing a viscosity adjuster into silicone oil are used as the macromolecular freezing agent.

15. A freezing type chuck machining method according to claim 2, wherein a cream or paste made by mixing a viscosity adjuster into silicone oil is so coated that it connects a peripheral surface of the workpiece and the fixing surface.

16. A freezing type chuck machining method according to claim 2, wherein a cream or paste made by mixing a viscosity adjuster into silicone oil is so coated that it connects a peripheral surface and a top surface of the workpiece and the fixing surface.

17. A freezing type chuck machining method according to claim 2, wherein the silicone oil is a low molecular weight silicone oil whose freezing point is near room temperature.

* * * * *